US011731496B2

(12) United States Patent
Gering

(10) Patent No.: US 11,731,496 B2
(45) Date of Patent: Aug. 22, 2023

(54) VEHICLE ROOF COMPRISING A BEARING DEVICE FOR A COVER

(71) Applicant: Webasto SE, Stockdorf (DE)

(72) Inventor: Sebastian Gering, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 186 days.

(21) Appl. No.: 17/424,012

(22) PCT Filed: Feb. 24, 2020

(86) PCT No.: PCT/EP2020/054765
§ 371 (c)(1),
(2) Date: Jul. 19, 2021

(87) PCT Pub. No.: WO2020/173872
PCT Pub. Date: Sep. 3, 2020

(65) Prior Publication Data
US 2022/0097503 A1    Mar. 31, 2022

(30) Foreign Application Priority Data
Feb. 28, 2019 (DE) ...................... 10 2019 105 104.5

(51) Int. Cl.
*B60J 7/05* (2006.01)
*B60J 7/053* (2006.01)
(Continued)

(52) U.S. Cl.
CPC ................ *B60J 7/05* (2013.01); *B60J 7/022* (2013.01); *B60J 7/024* (2013.01); *B60J 7/028* (2013.01);
(Continued)

(58) Field of Classification Search
CPC ..... B60J 7/02; B60J 7/022; B60J 7/024; B60J 7/028; B60J 7/04; B60J 7/043;
(Continued)

(56) References Cited

U.S. PATENT DOCUMENTS

| 5,464,267 A | 11/1995 | Racine et al. |
| 6,659,541 B1 | 12/2003 | Guicheteau |

(Continued)

FOREIGN PATENT DOCUMENTS

| DE | 3715268 A | * 1/1988 | ............ B60J 7/0435 |
| DE | 10348545 A1 | 5/2005 | |

(Continued)

OTHER PUBLICATIONS

Fuerst, "Vehicle Roofs", Published: Feb. 24, 1988, Edition: DE3715268A, Publisher: British/German Patent Offices (Year: 1988).*

(Continued)

*Primary Examiner* — Dennis H Pedder
*Assistant Examiner* — Joyce Eileen Hill
(74) *Attorney, Agent, or Firm* — Fitch, Even, Tabin & Flannery, LLP

(57) ABSTRACT

A vehicle roof opening having a cover and bearing device which displaceably supports the cover on a roof-side longitudinal guide rail a front and rear bearing unit, which moves the cover between a closed and at least one deployed ventilation positions. The front bearing unit may have a bearing arm, one end which pivotally mounts the cover and the other end which is slidingly and pivotally mounted on the longitudinal guide rail; carries out a positioning movement controlling the cover front region, when said cover is moved from its closed position into its ventilation position and/or into an open position. The bearing arm may be pivotally mounted by a rocker-type bearing having a pivot bearing and two sliding elements, on the longitudinal guide rail in a slidingly mounted bearing carriage, and a pivot-control unit guides the two sliding elements to achieve the rocker-type pivoting action of the bearing arm.

17 Claims, 22 Drawing Sheets

(51) Int. Cl.
*B60J 7/057* (2006.01)
*B60J 7/02* (2006.01)
*B60J 7/043* (2006.01)

(52) U.S. Cl.
CPC .............. *B60J 7/043* (2013.01); *B60J 7/0435* (2013.01); *B60J 7/053* (2013.01); *B60J 7/057* (2013.01); *B60J 7/0573* (2013.01)

(58) Field of Classification Search
CPC ... B60J 7/0435; B60J 7/047; B60J 7/05; B60J 7/053; B60J 7/057; B60J 7/0573
USPC ...... 296/216.01–216.3, 216.05, 216.08, 221, 296/222, 223
See application file for complete search history.

(56) References Cited

U.S. PATENT DOCUMENTS

| | | | |
|---|---|---|---|
| 2016/0200183 | A1 | 7/2016 | Hölzel et al. |
| 2018/0009296 | A1 | 1/2018 | Heidan et al. |

FOREIGN PATENT DOCUMENTS

| | | | | |
|---|---|---|---|---|
| DE | 10082186 | B4 | 8/2005 | |
| DE | 102006062543 | A1 | 7/2008 | |
| DE | 102010034566 | A1 | 2/2012 | |
| DE | 102012023098 | A1 * | 5/2014 | ............. B60J 7/024 |
| DE | 102013109097 | B3 | 12/2014 | |
| DE | 102013109099 | B3 | 12/2014 | |
| DE | 102016106001 | A1 | 10/2017 | |
| EP | 3250404 | B1 | 4/2019 | |
| JP | H0732888 | A | 2/1995 | |
| WO | WO-2016078928 | A1 * | 5/2016 | ............. B60J 7/024 |

OTHER PUBLICATIONS

Faerber, "Openable Vehicle Roof With an Adjustable Cover", Published May 26, 2016, Edition: WO-2016078928-A1, Publisher: German Patent Office (Year: 2016).*

Faerber, "Sunroof of a Vehicle", Published: Nov. 27, 2012, Publisher: German Patent Office, Edition: DE102012023098A1 (Year: 2012).*

International Search Report for PCT/EP2020/054765 dated May 20, 2020 in English and German (5 pages).

Extended Search Report for PCT/EP2020/054765 dated May 20, 2020 in English (16 pages with English translation).

German Examination Report dated Dec. 11, 2021, in German (13 pages including Machine translation).

* cited by examiner

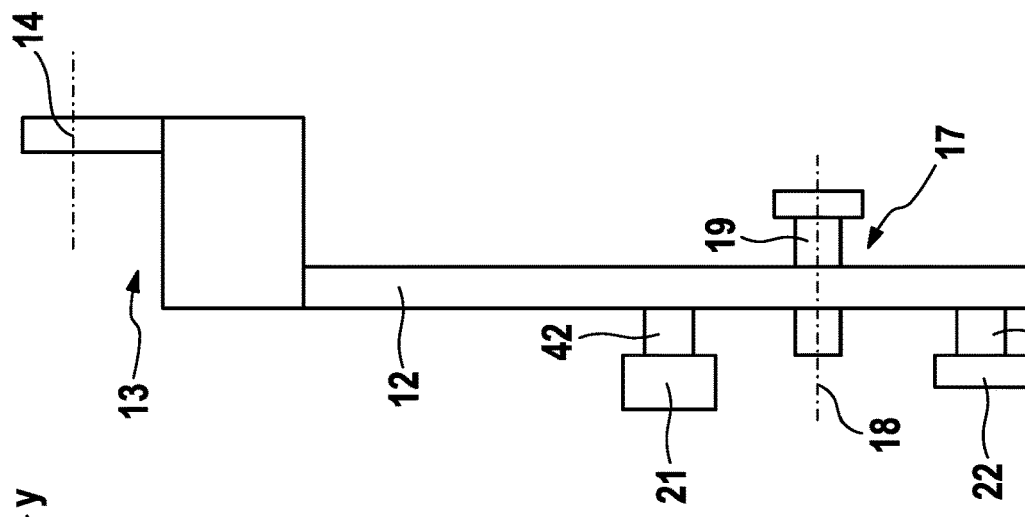
Fig. 17
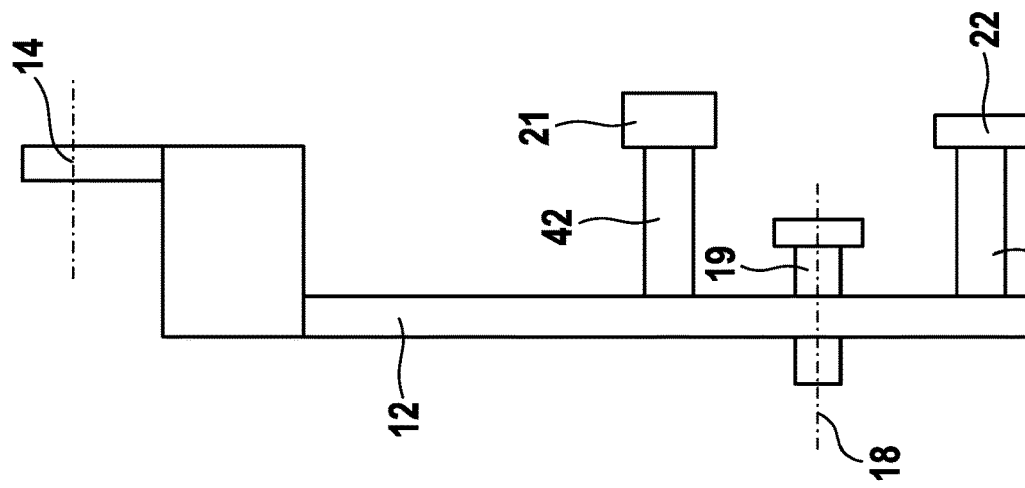
Fig. 18
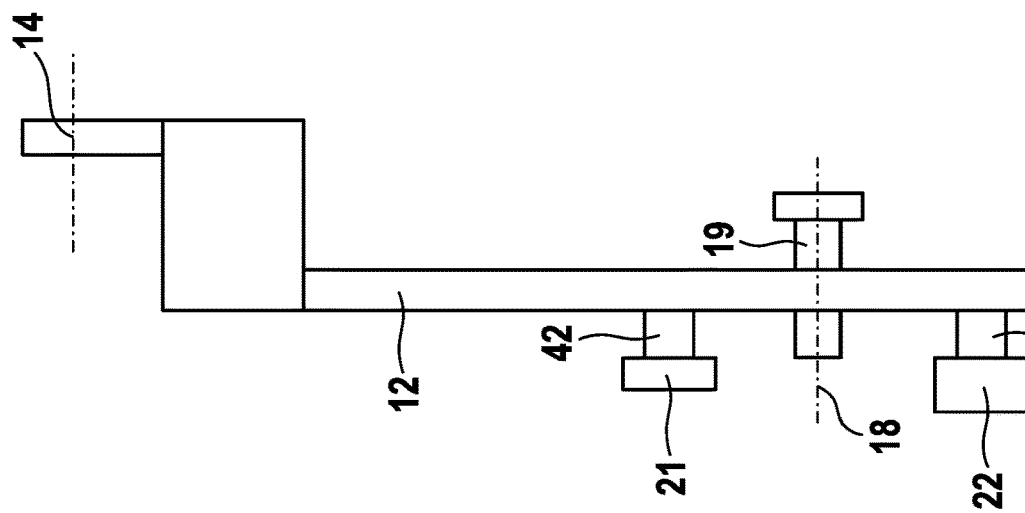
Fig. 19
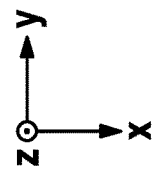

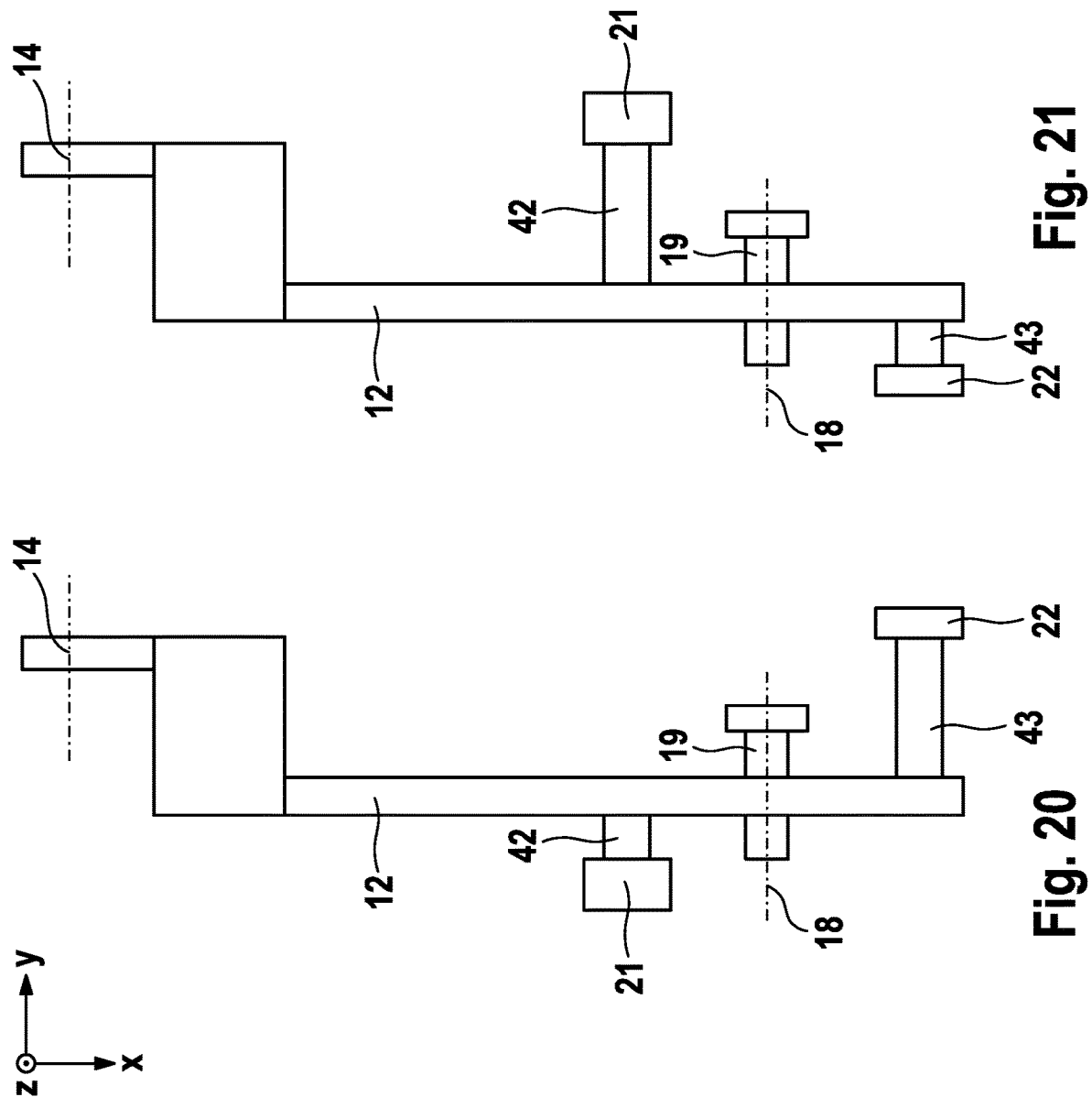

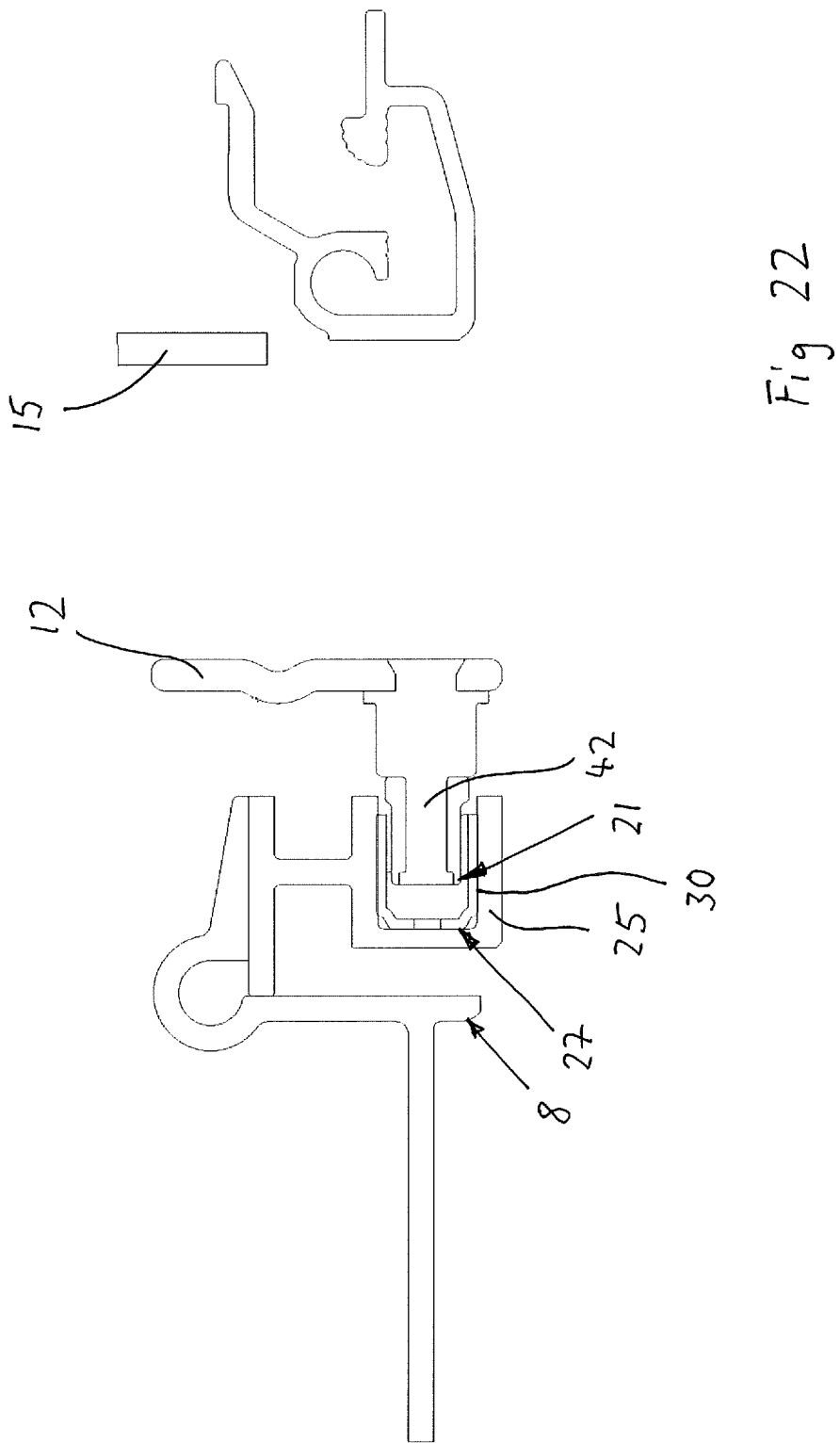

VEHICLE ROOF COMPRISING A BEARING DEVICE FOR A COVER

CROSS-REFERENCE TO RELATED APPLICATIONS

This application is a U.S. national phase application filed under 35 U.S.C. § 371 of International Application No. PCT/EP2020/054765, filed 24 Feb. 2020, designating the United States, which claims priority from German Patent Application No. 10 2019 105 104.5, filed 28 Feb. 2019, which are hereby incorporated herein by reference in their entirety for all purposes.

FIELD

The invention relates to an openable vehicle roof comprising a cover and a bearing device which movably supports the cover on a roof-side longitudinal guide by means of a front bearing unit and a rear bearing unit and adjusts said cover between a closed position in a roof opening and at least one deployed ventilation position, wherein the front bearing unit has a bearing arm, one end of which pivotably supports the cover and the other end of which is mounted displaceably and pivotably on the longitudinal guide and carries out an adjusting movement controlling a cover front region when the cover is shifted from its closed position into its ventilation position and/or into an open position.

BACKGROUND

A vehicle roof of the type in question has been disclosed in DE 10 2006 062 543 A1. A front bearing unit has a bearing arm, the front region of which pivotably supports the cover and the rear end of which is mounted pivotably on a carriage, which is mounted displaceably on a longitudinal guide. The central portion of the bearing arm contains a slider which is guided in a sliding manner at a guide slot arranged fixedly on the roof side and supports the bearing arm in its respective pivoting position at the guide slot. The guide slot has a first front horizontal lower portion, a second rising portion and a third horizontal upper portion. The bearing arm is in a front position when the cover is closed and is shifted rearward with the carriage during a cover opening movement, wherein the slider positions the bearing arm in its pivoting position in accordance with the profile of the guide slot and supports the weight of the cover acting on the bearing arm. The distance between the slider and the pivot bearing on the carriage must therefore not be too small so as not to excessively load the slider by the weight force emanating from the cover. On the other hand, a greater distance between the slider and the rear pivot joint on the carriage requires a substantially greater height difference of the guide slot in the z direction in its initial profile in order to be able to provide the necessary deflection of the bearing arm.

SUMMARY

The invention is based on the object of providing a vehicle roof which is mentioned at the beginning and which is improved in respect of the bearing and supporting function of the bearing arm.

This object is achieved according to the invention, in the case of the vehicle roof mentioned at the beginning, in that the bearing arm is mounted pivotably on the longitudinal guide, by means of a rocker-like mounting having a pivot bearing and two sliders, on a bearing carriage, which is mounted displaceably on the longitudinal guide, and in that a pivot-control unit guides the two sliders for the rocker-like pivoting of the bearing arm.

Advantageous refinements of the invention are specified in the dependent claims.

The rocker-like mounting by means of the two sliders, which are arranged on the bearing carriage in the longitudinal direction on both sides of the pivot bearing, provides a dual support of the bearing arm at the two guide slots of the longitudinal guide. The two sliders can thus be arranged closer to the pivot bearing and provide an improved support in comparison to a pivot mounting with only one slider of the deployment lever or bearing arm according to the prior art mentioned at the beginning. The smaller distance between said two sliders and the pivot bearing of the bearing arm in relation to the distance of the only one slider to the pivot bearing of the prior art deployment lever supporting said slider means that the height offset required for pivoting out the bearing arm or level difference along the sliding track via the profile of the front control slot and the rear control slot is comparatively small, and therefore the construction space for the longitudinal guide is also reduced in the vertical or z direction. A compact sliding unit having a plurality of, and for example two, individual sliding elements or sliding blocks which are arranged, for example, one behind the other in the sliding direction is also considered to be such a slider.

In a preferred embodiment, it is provided that the two sliders are arranged on the bearing arm opposite each other in the longitudinal direction or x direction with respect to the pivot bearing and are each guided at an associated guide slot of the longitudinal guide. Owing to this arrangement relative to the pivot axis, the two sliders may also be referred to as front slider and as rear slider. The two sliders can be exactly opposite each other with respect to the pivot axis and can thus lie on a straight line through the pivot axis, or they are arranged in such a manner that they form an angle of less than 180° to each other with respect to the pivot axis. The respective distance of the two sliders from the pivot axis is preferably identical in size, but may also differ in size.

The pivot-control unit expediently comprises two control slots for the two sliders, i.e. in each case one control slot for one of the two sliders. The control slots adjoin the guide slots at the front end thereof. The respective profile of the control slots predetermines, for the sliders guided thereon, a pivoting movement of the bearing arm, the pivoting movement controlling the cover front region.

In particular, it is provided that the pivot-control unit has a front control slot for the front slider, with respect to the longitudinal direction or direction of longitudinal movement of the cover, and a rear control slot for the rear slider, and that the two control slots raise or lower the two sliders to the level of the respective guide slot. Expediently, the two control slots are formed identically or in a corresponding manner in the profile of their control slots.

According to a preferred refinement, it is provided that the two guide slots are arranged spaced apart from each other in the transverse direction, and that the bearing arm is guided with the pivot bearing thereof between the two guide slots. The two sliders assigned to the respective guide slot are expediently arranged opposite each other on the bearing arm in such a manner that the one slider is arranged in the transverse direction inward from the bearing arm and the other slider is arranged in the transverse direction outward from the bearing arm or on the inner side thereof or on the outer side thereof. The sliders have, for example, sliding caps which are attached to bearing parts which protrude from the bearing arm on both sides. The sliders can have identical or different widths in the transverse direction or transversely with respect to the respective sliding track of the guide slots and of the control slots. The respective distance of the sliders from the bearing arm can be determined by a corresponding length of the bearing parts of the sliders. A respective setting or adaptation of the position of the sliders to the guide slots and the control slots is therefore possible.

As an alternative to the above-explained arrangement of the guide slots, it can be provided that the two guide slots are arranged one above the other, that the bearing arm is guided with the pivot bearing inward or outward in the transverse direction next to the two guide slots, and that the two sliders assigned to the respective guide slot are arranged on the bearing arm on its side facing the guide slots.

In a further preferred configuration, the upper guide slot is provided for guiding the front slider and the lower guide slot for guiding the rear slider, and that, in the longitudinal direction, the front control slot is formed in a rising manner in order to raise the front slider and the rear control slot is formed in a falling manner in order to lower the rear slider from the front closed position of the cover when the bearing arm is pivoted downward. However, further modified arrangements and assignments of the two control slots and of the two sliders can also be used for the rocker-like pivot mounting of the bearing arm.

Expediently, the rear control slot is arranged laterally next to the upper guide slot or next to a flatly extending transition portion of the front control slot. The two control slots can have the same width and can be arranged laterally offset such that the two sliding paths of the sliders do not have to be designed to cross over each other.

In a particularly preferred configuration, a front portion of the rear control slot is arranged level with the upper guide slot and the raised main portion of the front control slot, and that the front control slot, laterally next to a flatly extending transition portion, or the adjoining upper guide slot has a passage opening for the rear slider. Said passage opening permits a compact configuration of the two guide slots and of the control slots in the transverse direction since the sliding paths of the two sliders can now at least partially cross over each other. In such a configuration, a lower slot sliding track of the upper guide track or the front control slot of the pivot-control unit can have the opening for moving the rear slider during its lifting or lowering movement along the rear control slot. Expediently, the lower slot sliding track of the upper guide track is then formed with a reduced width next to the opening.

Expediently, the rear slider contains a position offset inward in the transverse direction or y direction and/or a reduced width for the passage through the opening. Accordingly, the two sliders can differ in width in the transverse direction, with the rear slider being adapted in its width and position to said reduced width.

Expediently, the pivot-control unit is formed as an independent component. The pivot-control unit is preferably formed as a plastics injection molded part, but it can also be formed from metal. The pivot-control unit is connected to the longitudinal guide, for example by screwing to the roof frame or to a guide rail forming the longitudinal guide, or is coupled thereto by other means, for example a plug-in connection. However, the pivot-control unit can also be formed together with the longitudinal guide, for example with at least one of the two guide slots or in general with a guide rail which contains or forms the two guide slots.

Expediently, a wind deflector device is arranged on the vehicle roof, said wind deflector device having a wind deflector bow which is prestressed in a pivoting-out position, for example by means of spring force, and has in each case a lateral bow arm which is mounted pivotably on the roof side. Preferably, the bearing arm has an engagement part which is in control engagement on the bow arm, in particular on a, for example upper-side, sliding surface of the bow arm. Since the bearing arm contains or provides the engagement part, a control part additionally to be provided, for example, on the cover can be dispensed with.

Expediently, the bearing arm comprises an inwardly cranked front portion, on which a pivot bearing supporting the cover, and the downwardly protruding engagement part, which has in particular a runner or a sliding runner, are arranged. This configuration provides a particularly compact arrangement of the bearing arm with the engagement part and of the wind deflector bow with the bow arm which is to be actuated by the engagement part.

In a preferred embodiment, when the cover is initially opened, the front portion of the rearwardly moving bearing arm pivots out upward, with the engagement part moving on a rising track curve, to which a similarly rising initial portion of the sliding surface of the bow arm is adapted. Therefore, when the cover is initially opened, the wind deflector bow can still be held in a lower position by the pivoting bearing arm. Furthermore, the front portion of the bow arm can be bent or cranked downward corresponding to the rising initial portion of the sliding surface of the bow arm such that, in a pivoted-down rest position of the wind deflector bow, a front, central wind-directing profile of the wind deflector bow can be arranged in a comparatively low position on a roof transverse frame part, for example in a gutter, while the lateral bow arms remain on the guide rails in a less lowered position.

Expediently, the rear bearing unit takes over the longitudinal securing of the cover and the deployment of the cover. In particular, the rear bearing unit is the sole drive unit for actuating and longitudinally shifting the cover. This means that a releasable coupling is not required between the rear bearing unit, which is or has the drive unit, and the front bearing unit of the cover.

In an expedient configuration, the rear bearing unit has a drive carriage on which a rear deployment lever, which is coupled pivotably to the cover or to a cover carrier, is pivotably mounted, wherein the deployment lever has a locking slider. The deployment lever is held locked with the locking slider at a roof-mounted locking slot when the cover is closed. The locking slider pivots out at said locking slot during the initial longitudinal shifting of the drive carriage and, when the cover is deployed in the ventilation position, the locking slider is decoupled from the locking slot and can be shifted longitudinally with the deployment lever or the drive carriage.

The longitudinal guides or the guide rails and the bearing units of the cover are provided on the vehicle roof on both sides and symmetrically with respect to the roof opening or with respect to the longitudinal axis of the vehicle. The description is undertaken essentially only with reference to said guide and bearing units on one of the two longitudinal sides of the cover.

In principle, "horizontally" is understood as meaning a direction or movement along the roof or roof-side guides, which can also follow a curvature of the roof in the longitudinal direction.

A cover for closing and at least partially opening up the roof opening is any roof element which can take over this function irrespective of its shape or configuration. Such a roof element is, for example, a transparent glass cover or plastics cover on which frame and bearing parts can be attached or integrally formed.

BRIEF DESCRIPTIONS OF THE DRAWINGS

The invention will be explained in more detail below using an exemplary embodiment of a vehicle roof according to the invention with reference to the drawing, in which:

FIG. 17 shows a top view of the bearing arm of the front bearing unit with a first arrangement of a front slider and a rear slider;

FIG. 18 shows a top view of the bearing arm with a second arrangement of the front slider and the rear slider;

FIG. 19 shows a top view of the bearing arm with a third arrangement of the front slider and the rear slider;

FIG. 20 shows a top view of the bearing arm with a fourth arrangement of the front slider and the rear slider;

FIG. 21 shows a top view of the bearing arm with a fifth arrangement of the front slider and the rear slider;

FIG. 22 shows a cross-sectional view of the bearing arm with its front slider in a position according to FIGS. 2 and 8;

DETAILED DESCRIPTION

Figure 1:
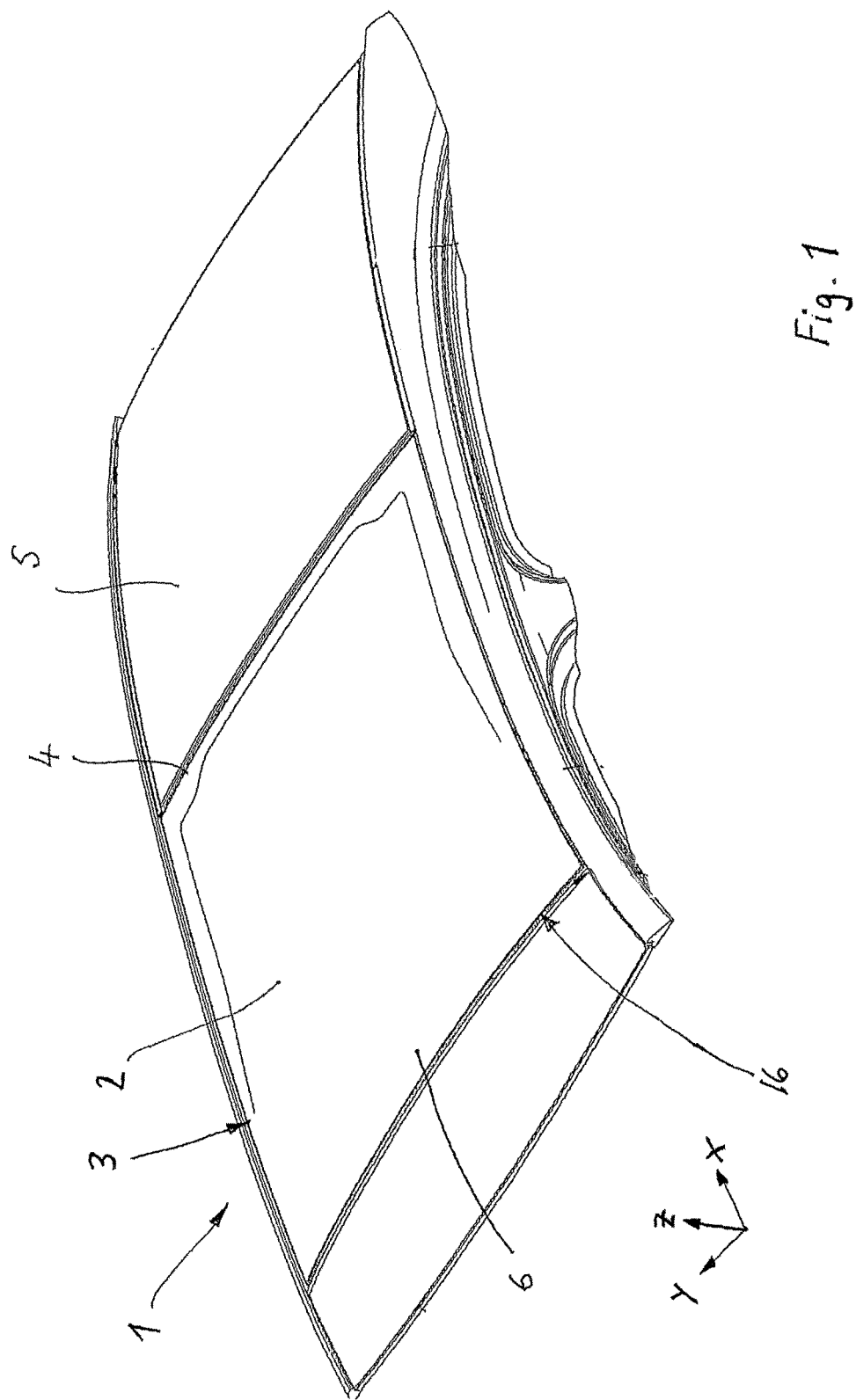
FIG. 1 shows an isometric view of an openable vehicle roof with an adjustable cover which is arranged in a closed position in a roof opening.
Figure 2:
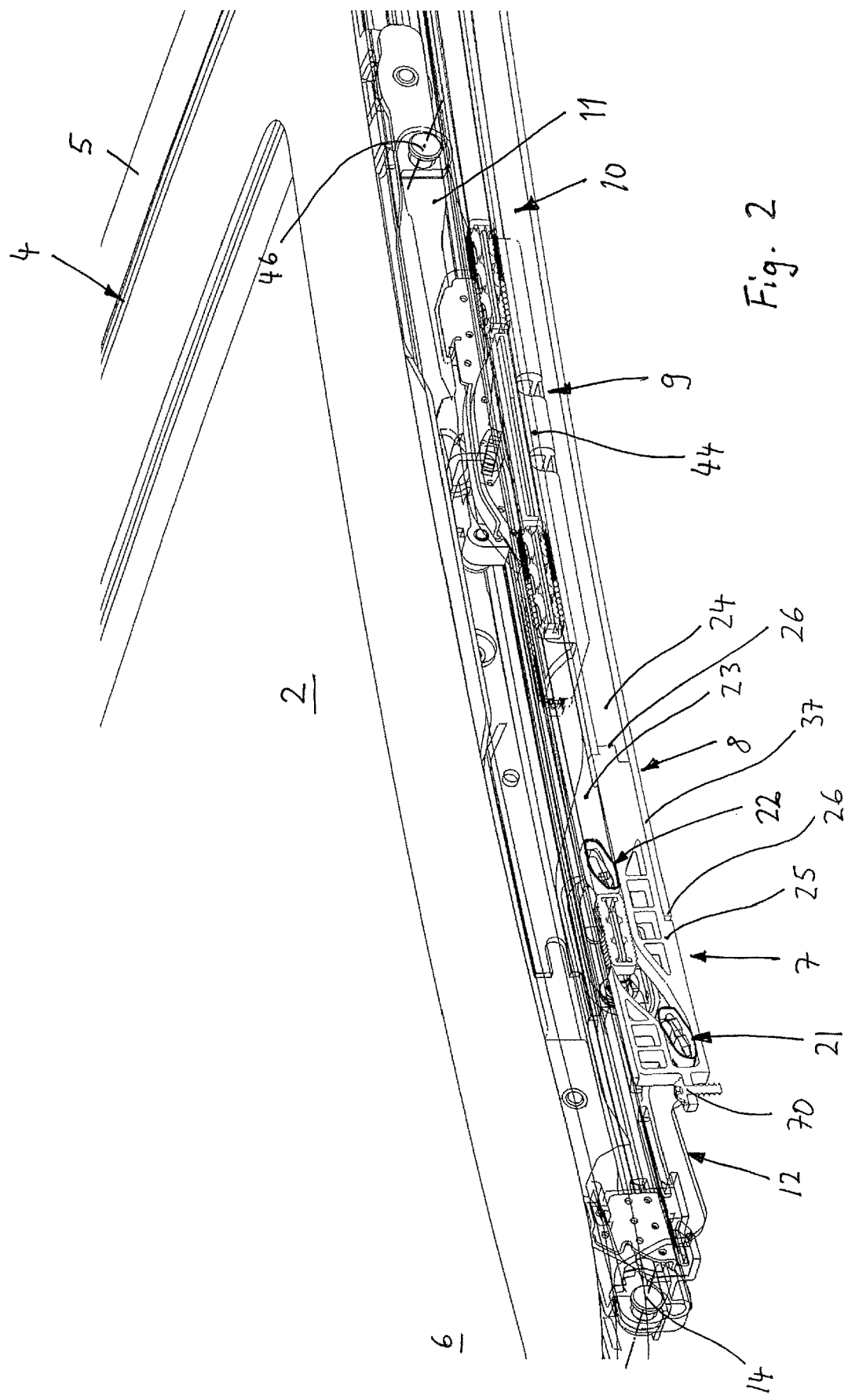
FIG. 2 shows an isometric view of the cover arranged in the closed position by a lateral bearing device.
Figure 3:
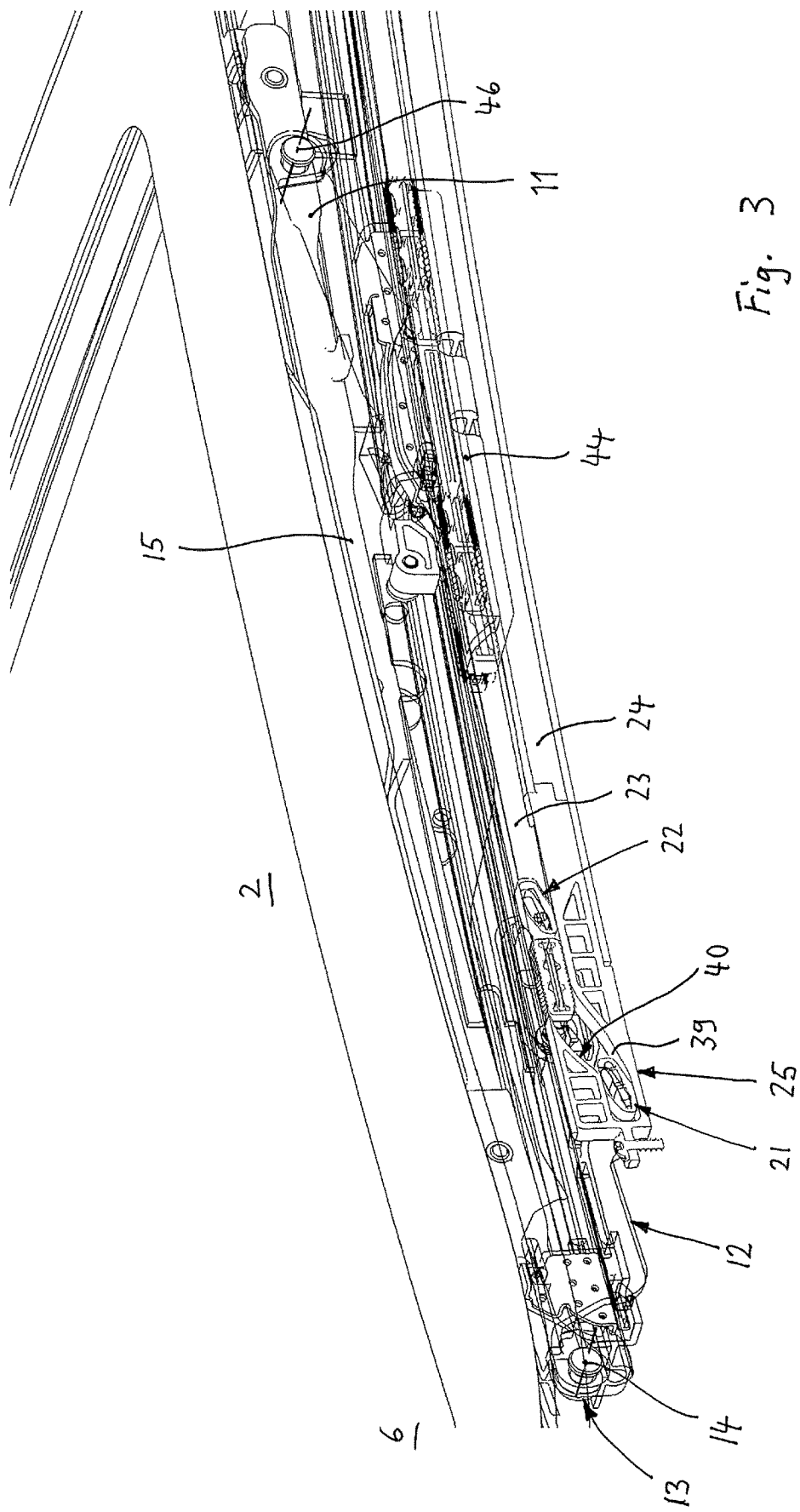
FIG. 3 shows an isometric view according to FIG. 2 of the bearing device which has slightly raised the cover at its rear edge by means of a rear bearing unit.
Figure 4:
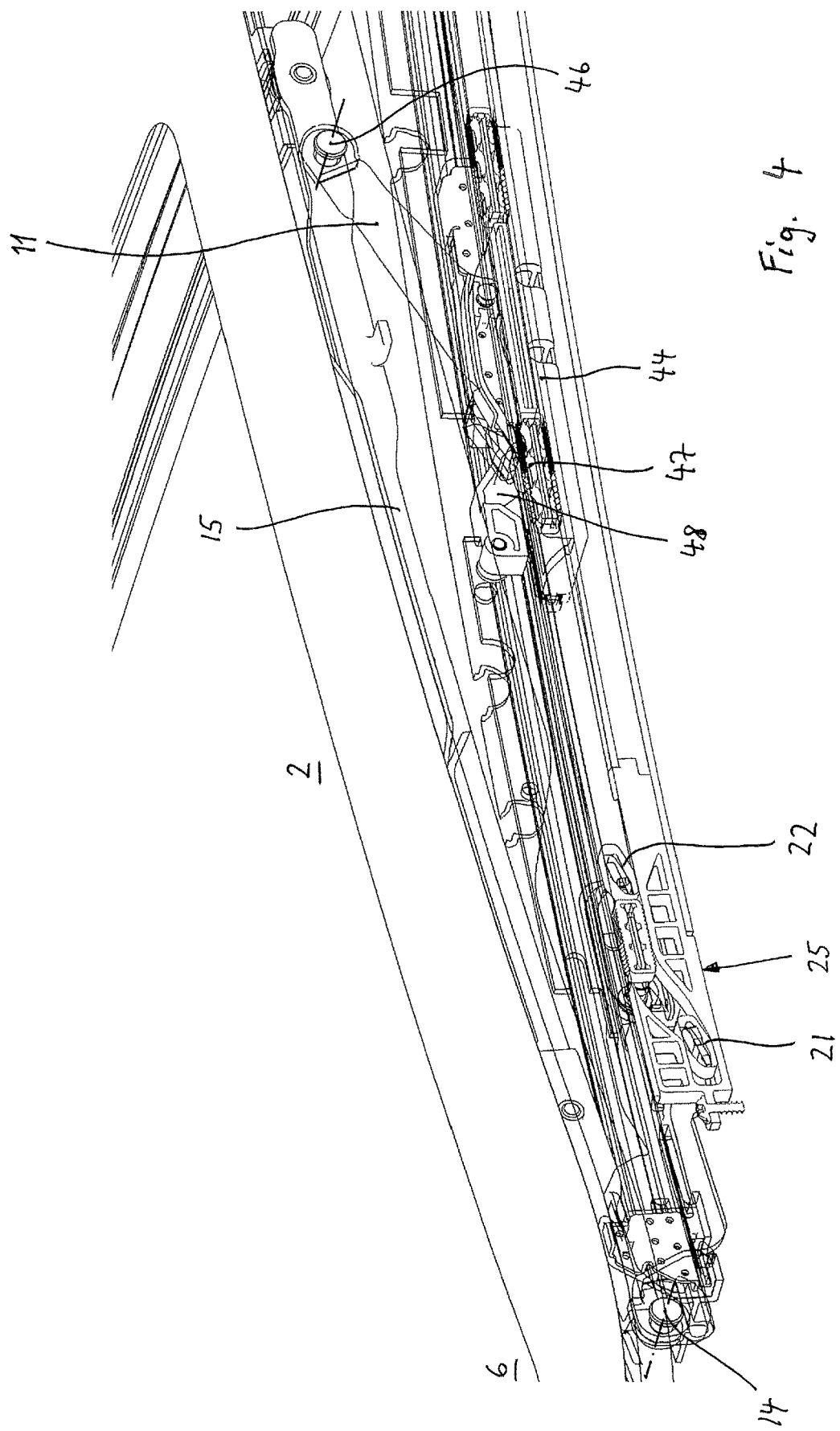
FIG. 4 shows an isometric view of the bearing device which has raised the cover at its rear edge into a ventilation position by means of the rear bearing unit.
Figure 5:
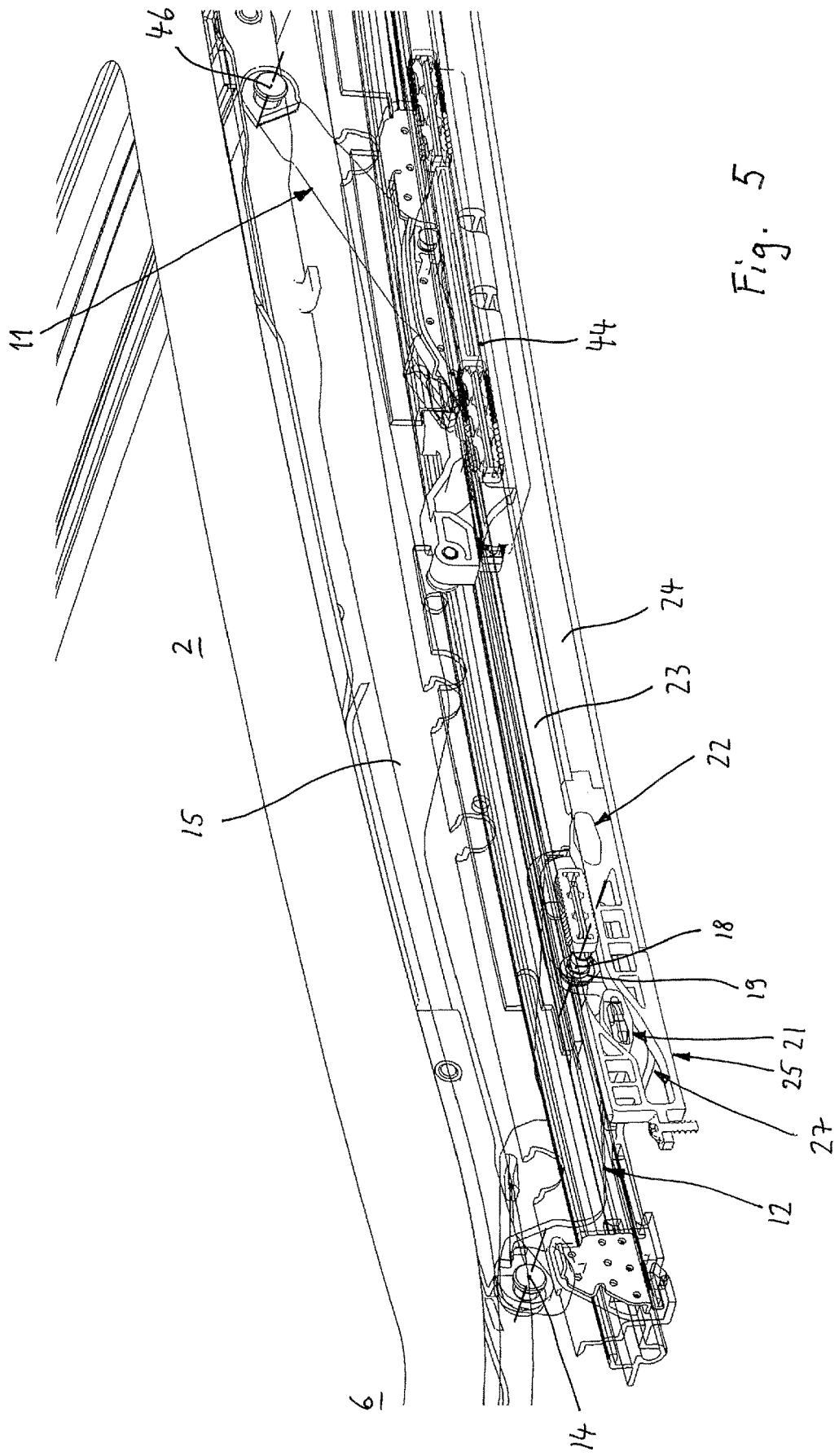
FIG. 5 shows an isometric view of the bearing device which has moved the cover slightly to the rear by means of the rear bearing unit, wherein a front bearing arm of a front bearing unit has been pivoted upward and has raised the cover at its front edge.

An openable vehicle roof 1 of a vehicle, such as, for example, a passenger vehicle, has a cover 2 of an openable roof system, which cover can be raised from a closed position in a roof opening 3 and can be adjusted into a ventilation position (see FIGS. 4 to 6) and can be moved from the raised ventilation position with its rear edge 4 via a roof portion 5 adjoining behind the roof opening 3 in the longitudinal direction of the vehicle or roof into an open position (see FIG. 3). Such a roof or roof system is, for example, an externally guided sliding roof or a spoiler roof. The rear roof portion 5 can basically be formed by a fixed roof or else by a movable roof part. The axial and directional designations used in the description, for example "front" and "rear", "top" and "bottom", "outer" and "inner", "horizontally" and "vertically", and also "laterally", in the transverse direction and in the longitudinal direction relate to a three-dimensional x, y, z vehicle system of coordinates.

A bearing device supporting the cover 2 is designed in such a manner that the cover 2 is movable on both sides of the roof opening 3, in each case by means of a front bearing unit 7 of the bearing device, which bearing unit is arranged below the front region 6 of the cover, along a lateral front longitudinal guide 8, which is arranged on the roof side and is attached or formed, for example, on a guide rail, and can be pivoted out into its ventilation position by means of a rear bearing unit 9, which can be mounted on a lateral rear longitudinal guide 10 or guide rail and has, for example, a rear deployment lever 11. The roof construction is substantially symmetrical with respect to a longitudinal center line of the vehicle roof 1, and therefore the description below is undertaken with reference to the bearing device which is arranged on the one longitudinal side of the roof opening 3 and has the bearing units 7 and 9.

The front longitudinal guide 8 of the front bearing unit 7 and the rear longitudinal guide 10 of the rear bearing unit 9 can be arranged or formed on or by the same guide rail, or they are arranged or formed on different guide rails.

The front bearing unit 7 has a bearing arm 12 (see FIGS. 2 to 7 and 22 to 25) which is connected at its front portion 13 by means of a pivot bearing 14 to a cover carrier 15 of the cover 2 or to another cover structure and pivotably supports the cover 2 in the region of its front edge 16. The cover carrier 15 is, for example, part of a cover frame or similar which is arranged on the underside of the cover 2 and bears a cover panel, for example a glass or plastics panel. The bearing arm 12 is mounted pivotably at its rear region 17 on a bearing carriage 20 by means of a pivot bearing 19 which forms a transverse pivot axis 18 and which is formed, for example, by a journal or a bearing axis. The bearing carriage 20 is mounted displaceably on the front longitudinal guide 8. The rear region 17 of the bearing arm 12 forms a rocker with a front slider 21, which is arranged upstream of the pivot bearing 19 in the longitudinal direction or x direction, and a rear slider 22 arranged behind the pivot bearing 19. The front slider 21 is assigned an upper guide slot 23 of the longitudinal guide 8 and the rear slider 22 is assigned a lower guide slot 24 of the longitudinal guide 8.

Figure 12:
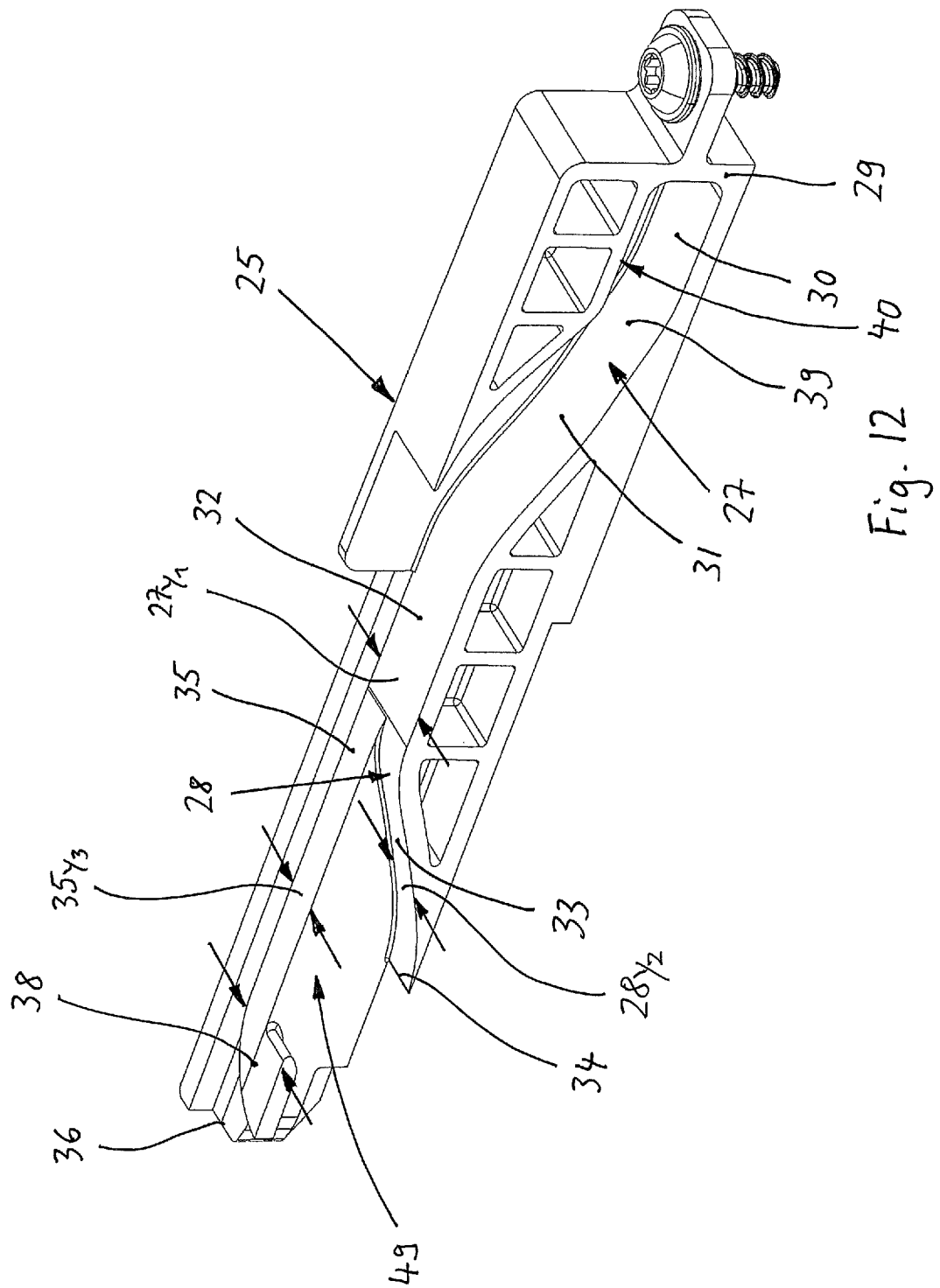
FIG. 12 shows an isometric view of a pivot-control unit of the front bearing unit.
Figure 13:
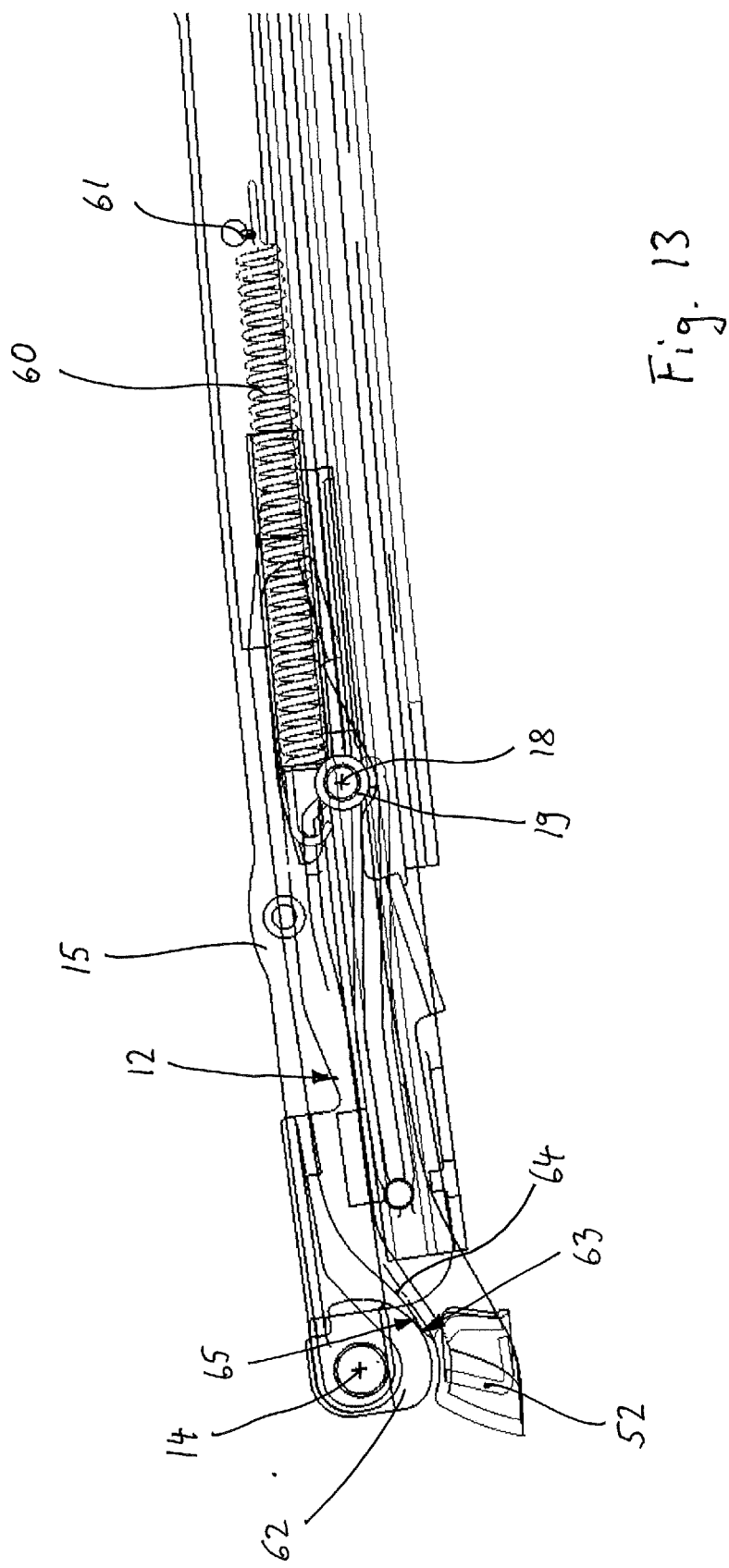
FIG. 13 shows a side view of a wind deflector bow of a wind deflector device of the vehicle roof with a lateral bow arm and with the bearing arm of the front bearing unit of the cover when the cover according to FIG. 2 is closed.

The bearing device has a pivot-control unit 25 which is arranged at the front end 26 of the front longitudinal guide 8. The pivot-control unit 25 contains (see FIG. 12) a front control slot 27, at which the front slider 21 is guided, and a rear control slot 28, at which the rear slider 22 is guided (also see FIGS. 22 and 25). The front control slot 27 begins at the front end 29 of the pivot-control unit 25 with an initial portion 30 on a lower level and extends in its width $27y_1$ to the rear via a rising intermediate portion 31 to a main portion 32 in particular extending flatly on an upper level. The rear guide slot 28 begins as a lateral portion of the main portion 32 of the front control slot 27 on the upper level thereof and extends rearward and downward via an intermediate portion 33, which descends in a curved manner and has a width $28y_2$ and ends in a slot end 34 on a lower level.

Furthermore, a transition portion 35 of the front control slot 27 extends, starting from the main portion 32 and laterally next to the rear control slot 28, further to the rear on the upper level with a width $35y_3$ as far as the rear end 36 of the pivot-control unit 25. The rear end 36 forms the connection to the longitudinal guide 8. The transition portion 35 of the front control slot 27 and the rear control slot 28 accordingly each have approximately half the width $35y_3$ or $28y_2$ of the width $27y_1$ of the front control slot 27 on the main portion 32.

The pivot-control unit 25 is arranged at the front end 26 of the front longitudinal guide 8 with its correspondingly formed rear end 36 in such a manner that the front control slot 27 is coupled flush with its transition portion 35 on the upper level to the front end of the upper guide slot 23 of the longitudinal guide 8, and the rear control slot 28 merges seamlessly with its descending intermediate portion 33 and the slot end 34 on the lower level with the lower guide slot 24 of the longitudinal guide 8. The part of the pivot-control unit 25 supporting or forming the intermediate portion 33 preferably rests on a portion 37 of the lower guide slot 24 that protrudes at the front end 26 in the longitudinal direction. The pivot-control unit 25 is fastened by means of a screw 70, illustrated by way of example, or the like, for example to the roof frame or to the guide rail or the longitudinal guide 8 which forms part of the roof frame.

The pivot-control unit 25 has, before its rear end 36, a connection portion 38 of the front control slot 27, which connection portion adjoins the transition portion 35 and is widened again to the original width $27y_1$ of the front control slot 27. The upper guide slot 23 borders said connection portion 38 by means of a lower guide surface.

The front control slot 27 has, in the pivot-control unit 25, both a lower-side slot sliding track 39 and an upper-side slot sliding track 40, which are opposite each other and guide the front slider 21 between them in a manner substantially free from play substantially in the vertical or z direction. The lower slot sliding track 39 extends over the entire length of the front control slot 27 in the pivot-control unit 25. The upper slot sliding track 40 extends in the pivot-control unit 25 at least over the initial portion 30 and over the rising intermediate portion 31. The further profile of the upper slot sliding track 40 can likewise be formed in the pivot-control unit 25. In an alternative configuration, the upper slot sliding track 40 ends with the intermediate portion 31 (see FIG. 12) and it is formed from the main portion 32 toward the rear end 36 of the pivot-control unit 25 by a guide track of the upper guide slot 23.

The bearing carriage 20 has, for example, a bearing profile with two profile limbs 66 and 67 which are spaced apart from each other (see FIGS. 23 and 24) and which bear the pivot bearing 19 and receive the bearing arm 12 between them. The bearing carriage 20 is arranged and slidingly mounted, and is displaceable in the longitudinal direction, on a dedicated, longitudinally extending guide track of the guide rail or front longitudinal guide 8 laterally inward next to the pivot-control unit 25. The bearing carriage 20 is slidingly mounted on a guide track 69 by means of at least one inner slider 68 (see FIG. 24) and can have an outer carriage slider 41 which is mounted, for example, in the upper guide slot 23. The two sliders 21 and 22 of the bearing arm 12 are attached to bearing parts 42 and 43 which protrude laterally outward from the bearing arm 12. The two sliders 21 and 22 can be fixedly attached to the bearing parts 42 and 43. At least one of the two sliders, for example the front slider 21, can also be formed as a rotary slider (see FIG. 22) which is mounted on the bearing part 42 providing a rotary mounting. The front slider 21 has such a width in the transverse direction that it is in sliding contact approximately over the entire width of the front control slot 27. The rear slider 22 has a reduced width in relation to the front slider 21 in the transverse direction, said width being adapted to the width of the rear control slot 28 or corresponding to said width. Accordingly, the width of the rear slider 22 is, for example, in particular approximately half the width of the front slider 21.

The rear bearing unit 9 has a drive carriage 44 on which the deployment lever 11 is mounted movably by means of a slot guide arrangement 45. The deployment lever 11 is coupled at its rear end to the cover 2 or to the cover carrier 15 by means of a pivot bearing 46. The drive carriage 44 is mounted displaceably along the rear longitudinal guide 10 on the guide rail and is connected by means of a drive cable to a drive motor mounted on the roof and is adjustable by said drive motor. The rear bearing unit 9 is designed, for example, in accordance with the rear bearing unit which is known from DE 10 2013 109 097 B3 and which supports, deploys and longitudinally moves the cover via the rear deployment arm described there or a first control lever. For a more detailed description of the design and the function of the rear bearing unit 9 of the bearing device according to the invention, reference is accordingly expressly made to DE 10 2013 109 097 B3.

Figure 8:
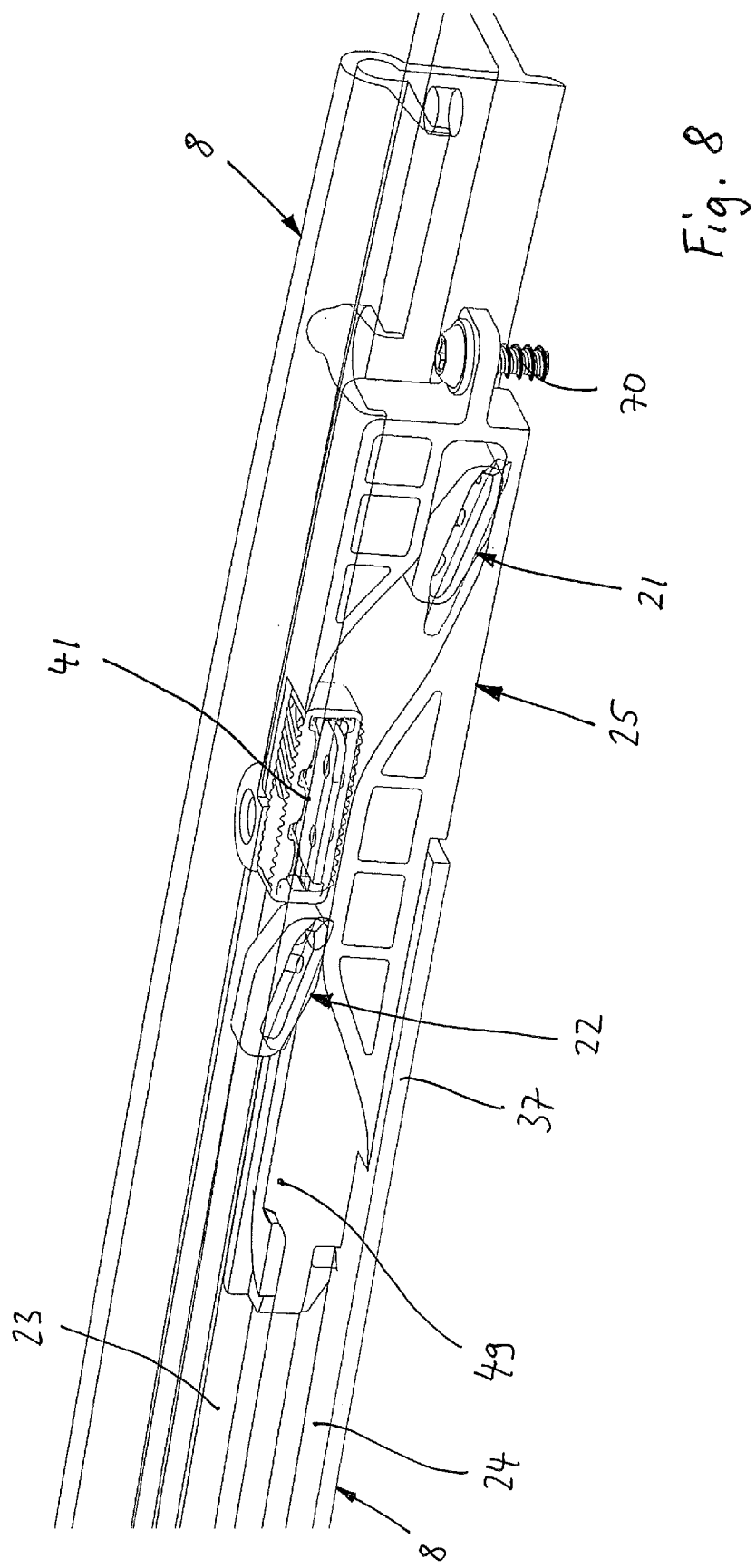
FIG. 8 shows an isometric inner view of the front bearing unit of the cover arranged in the closed position according to FIG. 2.

The functioning of the bearing device will be explained below. When the cover 2 is closed (FIGS. 2 and 8), the bearing arm 12 of the front bearing unit 7 is pivoted downward on the bearing carriage 20 with its front portion 13 about its transverse pivot axis 18 by the position of the front slider 21 in the front lower initial portion 30 of the front control slot 27 and of the rear slider 22 in the rear control slot 28 on the upper level of the main portion 32. Both the front slider 21 and the rear slider 22 are prevented from moving in the vertical direction in their respective control slots 27 and 28. Accordingly, the bearing arm 12 cannot carry out any pivoting movements, and the closed cover 2 is accordingly prevented from lifting or lowering movements at its front edge 16.

The drive carriage 44 of the rear bearing unit 9 is arranged in a front starting position in which it holds the rear deployment lever 11 in its pivoted-down rest position by means of the slot guide arrangement 45. The deployment lever 11 holds the cover 2 at its rear edge 4 via the pivot bearing 46 in a manner secured against lifting or lowering movements. The front end of the deployment lever 11 has a locking slider 47 which is in engagement in a roof-mounted locking slot 48 and prevents the deployment lever 11 from shifting longitudinally.

In order to raise the cover 2 at its rear edge 4 and pivot it out into a ventilation position (see FIG. 3), the drive carriage 44 of the rear bearing unit 9 is moved to the rear on the rear longitudinal guide 10. In the process, the slot guide arrangement 45 pivots the deployment lever 11 upwards at its rear end such that the cover 2 is raised at its rear edge 4. The locking slider 47 is lowered in the roof-mounted locking slot 48, but still remains in the locking slot 48, and therefore, in accordance with the profile of the locking slot 48 and the movement path of the locking slider 47, the deployment lever 11 does not undergo any longitudinal shifting, or only a very slight longitudinal shifting, for example for adapting the front edge 16 of the cover 2 to its pivoting-out movement. Accordingly, the cover 2 basically maintains its longitudinal position.

A further movement of the drive carriage 44 rearward (into the position of FIG. 4) pivots the deployment lever 11 into its greatest pivoted-out position, in which it has pivoted the cover 2 out at its rear edge 4 into its ventilation position. The locking slider 47 has pivoted out downward out of the locking slot 48 such that the roof-side longitudinal securing of the deployment lever 11 is raised. The pivoting-out of the deployment lever 11 has caused a slight movement of the cover 2 to the rear, and therefore the bearing arm 12 on the front bearing unit 7 is slightly moved back and the two sliders 21 and 22 have likewise carried out a small displacement into the initial horizontal portions of the front control slot 27 or the rear control slot 28, and therefore the bearing arm 12 has not yet been pivoted.

Figure 9:
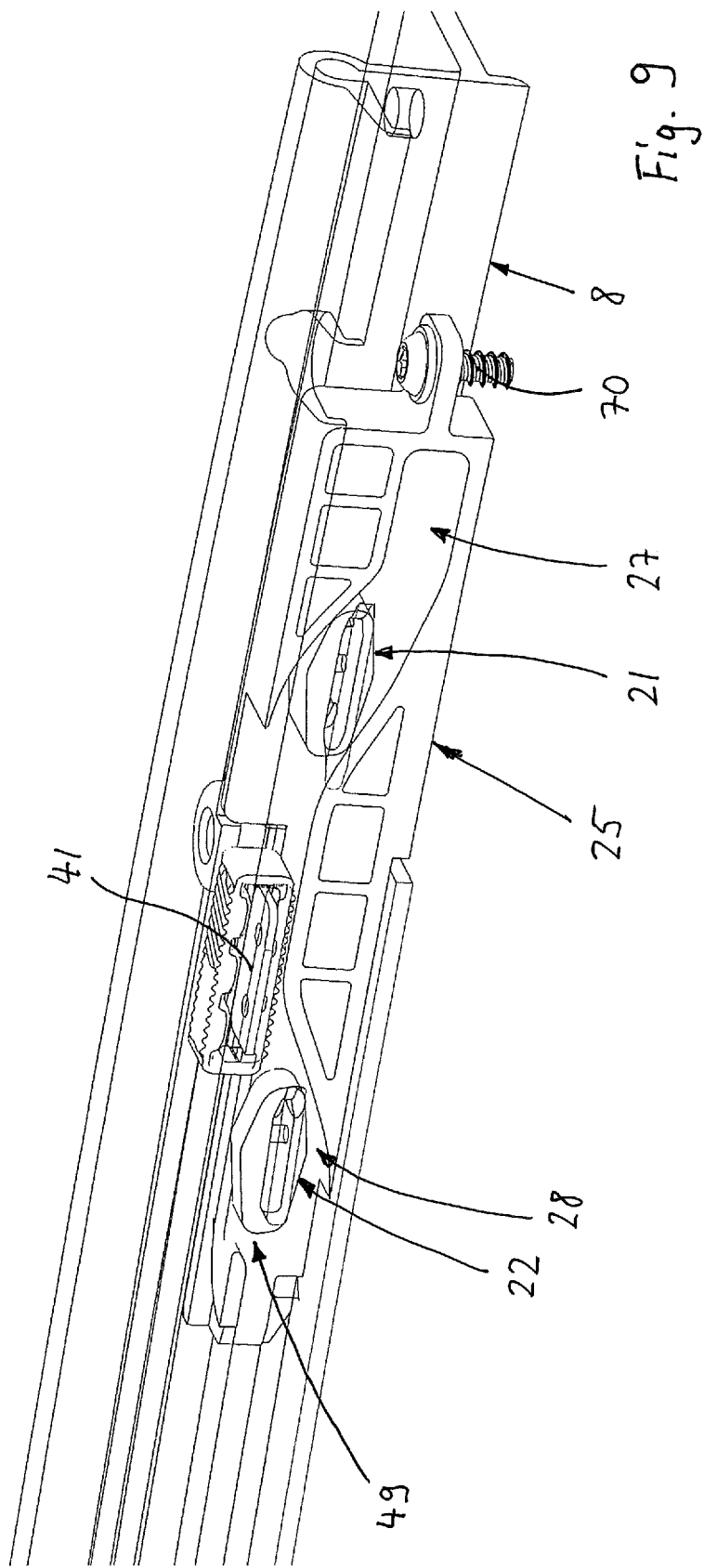
FIG. 9 shows an isometric inner view of the front bearing unit of the cover arranged in the position according to FIG. 5.

A further shifting of the drive carriage 44 to the rear (into the position of FIG. 5) draws the cover 2 to the rear via the rear deployment lever 11. The cover 2 pushes the bearing arm 12 likewise to the rear. The front slider 21 moves upward in its front control slot 27 and the rear slider 22 moves downward in its rear control slot 28 (position of FIG. 9) such that the bearing arm 12 is pivoted about its pivot axis 18 on the bearing carriage 20. The rising front portion 13 of the bearing arm 12 raises the cover 2 at its front edge 16. The rear slider 22 is lowered here on the intermediate portion 33, said slider passing through an opening 49 formed above the intermediate portion 33 and next to the transition portion 35.

Figure 6:
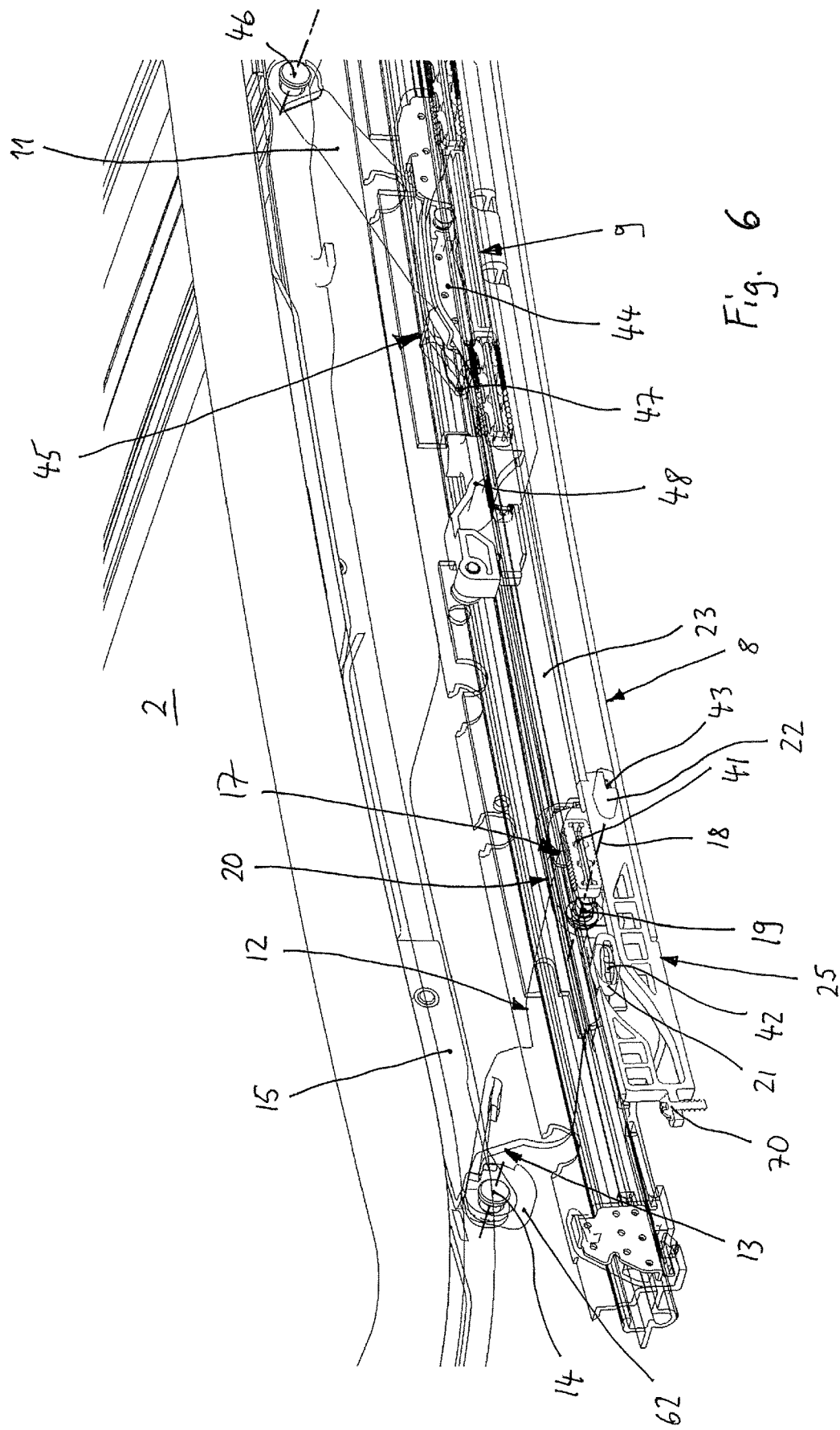
FIG. 6 shows an isometric view of the bearing device which has moved the cover further to the rear by means of the rear bearing unit and, in the process, has adjusted the front bearing arm into its upper pivoted-out position.
Figure 7:
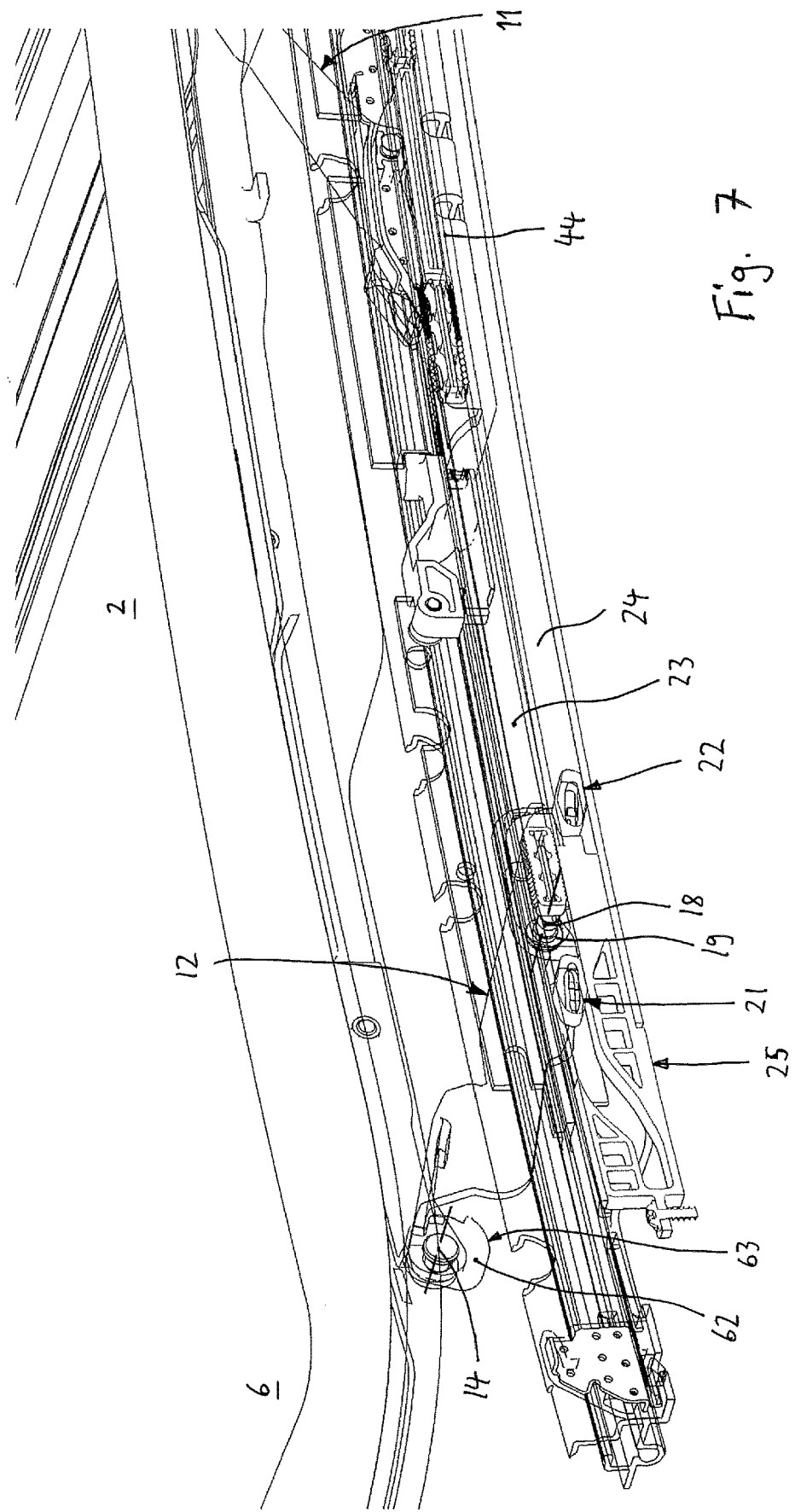
FIG. 7 shows an isometric view of the bearing device with the cover which has been adjusted into a rear open position by means of the rear bearing unit.
Figure 10:
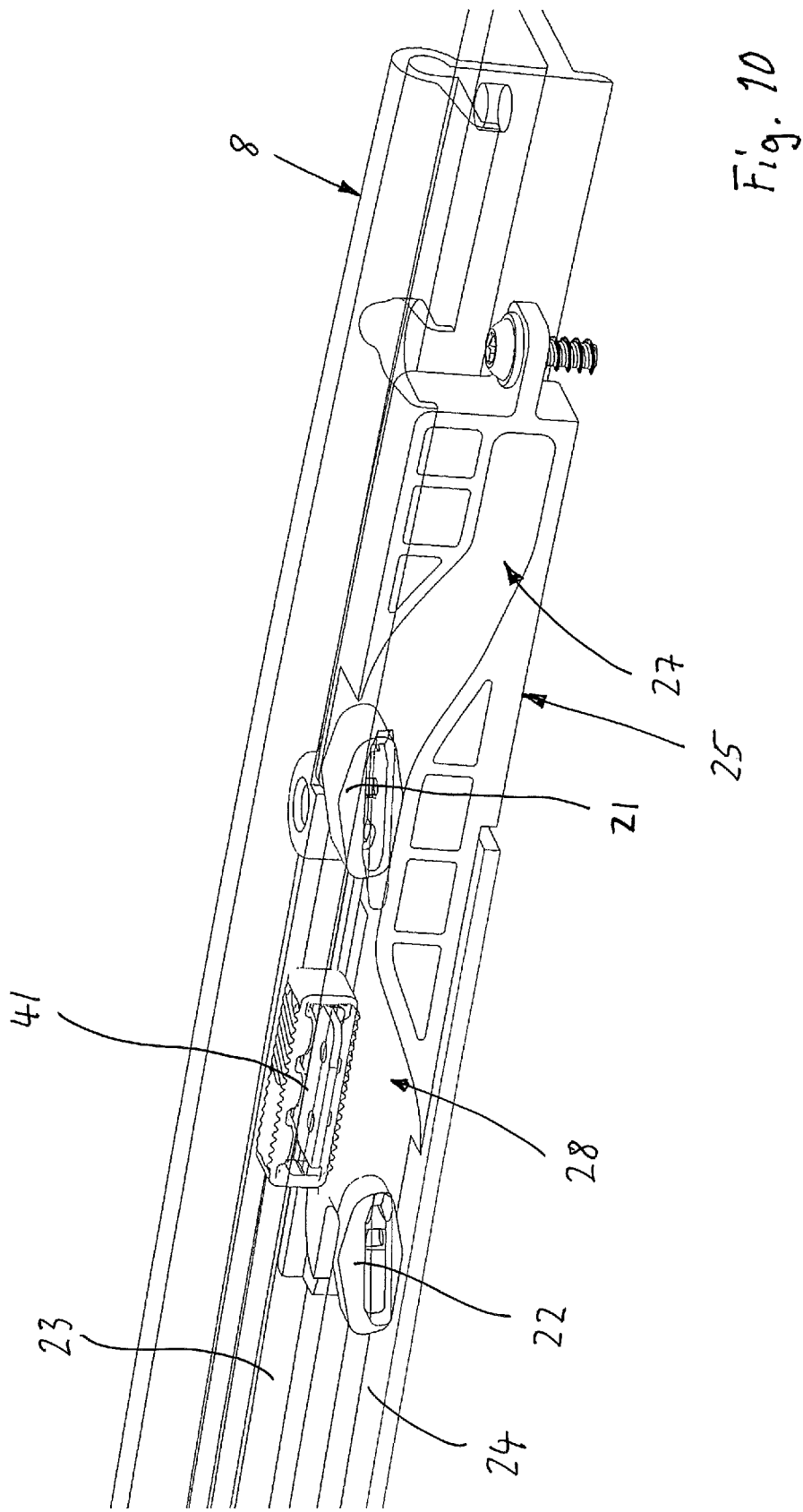
FIG. 10 shows an isometric inner view of the front bearing unit of the cover arranged in the position according to FIG. 6.
Figure 11:
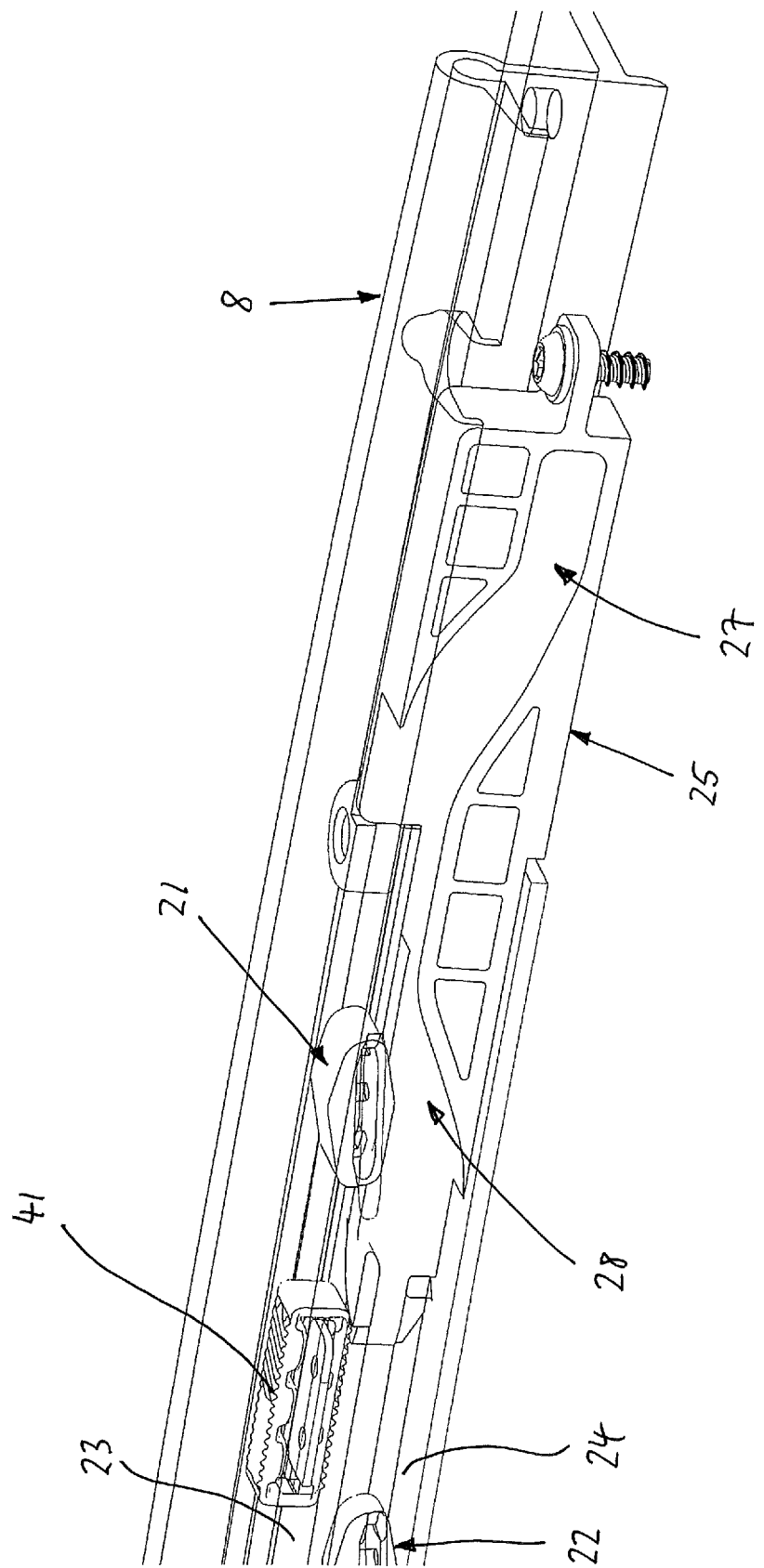
FIG. 11 shows an isometric inner view of the front bearing unit of the cover which is shifted further to the rear from the position illustrated in FIG. 10.

The drive carriage 44 which is once again moved further to the rear pushes the cover 2, via the deployment lever 11, likewise further to the rear (into the position of FIG. 6). The two sliders 21 and 22 of the bearing arm 12 moved at the same time by the cover 2 slide in their respective control slots 27 and 28 into the positions which are illustrated in FIG. 10 and in which the front slider 21 has reached its upper position on the upper level of the control slot 27 and the rear slider 22 has reached its position on the lower level of the lower control slot 28. The bearing arm 12 has thus reached its maximum pivoting position. The cover 2 is maximally raised at its front edge 16. The cover 2 can be displaced in this raised position to the rear over the rear roof portion 5 by further shifting of the drive carriage 44 in order to expose the roof opening 3 (position of FIGS. 7 and 11), wherein the sliders 21 and 22 slide in the assigned guide slots 23 and 24, respectively.

Furthermore, a wind deflector device 50 is arranged on the vehicle roof 1 (see FIGS. 13 to 16). A wind deflector bow 51 of the wind deflector device 50 has a central, transversely running wind-directing profile 52 and lateral bow arms 53 which are mounted at their rear ends 54 on respective longitudinal guides 55, for example by means of a bearing 56, so as to be pivotable and longitudinally shiftable. The wind deflector device 50 furthermore in each case has a deployment lever 57 which is coupled at one end to the wind deflector bow 51 in the front region of the bow arm 53 by means of a bearing so as to be pivotable about a transverse pivot axis 58 and is coupled at the other end to a roof-mounted pivot bearing about a transverse pivot axis 59. A tension spring 60 connects the bow arm 53 to a roof-side fastening point 61. The fastening point 61 is, for example, an opening on the guide rail or on the longitudinal guide 55, in which opening the tension spring 60 is fitted.

The front portion 13 of the bearing arm 12 is expediently cranked inward toward the cover carrier 15 and has, at the pivot bearing 14 or close to the latter, a downwardly protruding, for example disk-shaped engagement part 62 which contains a curved runner 63. The bow arm 53 of the wind deflector bow 51 has, on its upper side, a sliding surface 64 on which the engagement part 62 is in sliding engagement with its runner 63 during a longitudinal movement of the cover 2. The bow arm 53 is bent or cranked downward in its front region toward the wind-directing profile 52, and the sliding surface 64 accordingly has an initial portion 65 rising beginning from the wind-directing profile 52 in the longitudinal direction to the rear.

When the cover 2 is closed (see FIG. 13), the engagement part 62 rests with its runner 63 on the initial portion 65 of the sliding surface 64 at the front end of the bow arm 53. The pivot bearing 14 is located above the wind-directing profile 52. The engagement part 62 holds the wind deflector bow 51 in its rest position, which is pivoted downward on the roof frame, counter to the tensile force of the tension spring 60.

Figure 14:
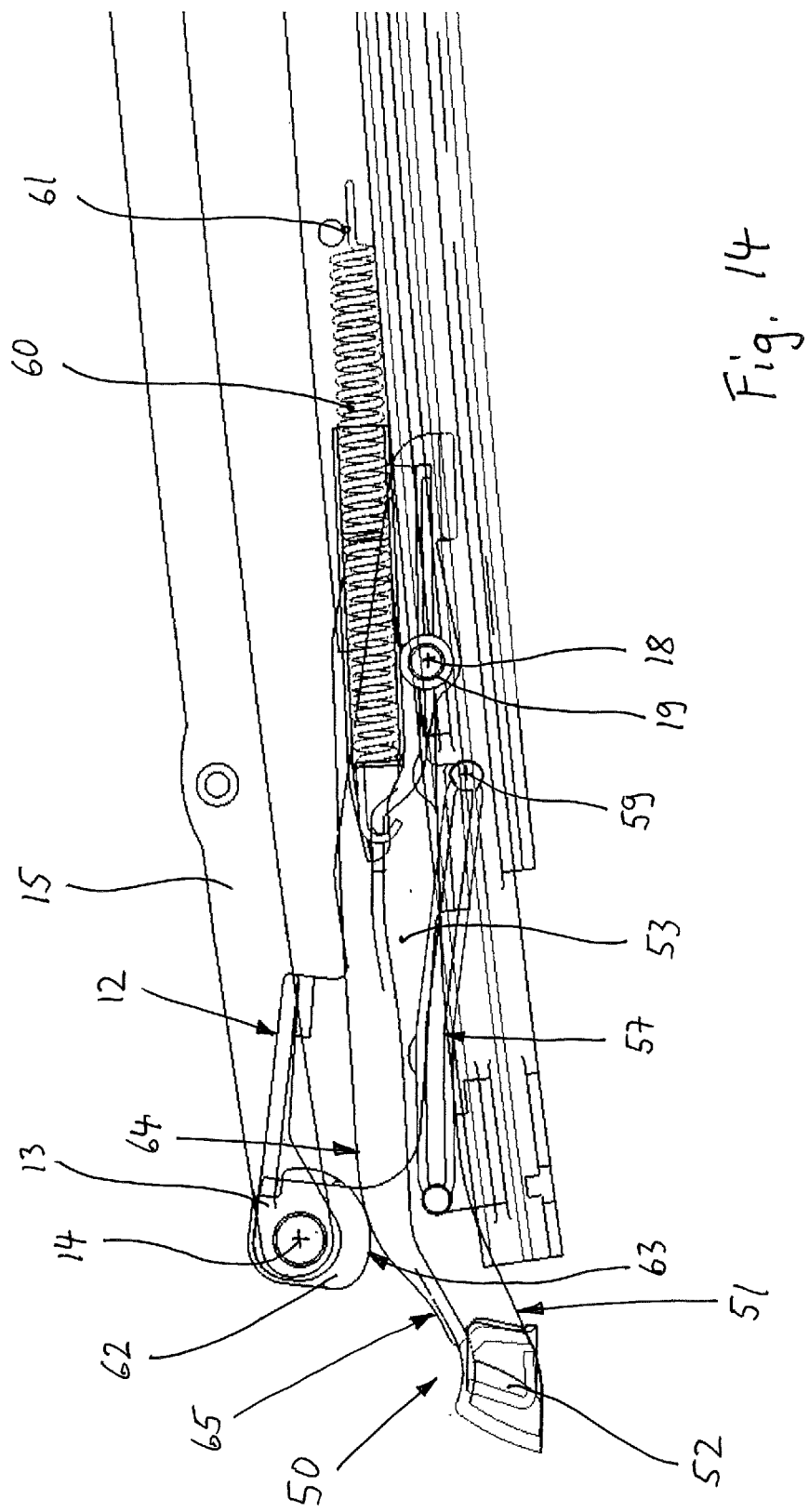
FIG. 14 shows a side view of the bow arm and the bearing arm in a position when the cover is initially opened.

When the cover 2 is opened, the bearing arm 12 moving to the rear pivots out upward at its front portion 13 about the transverse pivot axis 18 (see FIG. 14). In the process, the engagement part 62 is moved on a track curve, to which the initial portion 65 of the sliding surface 64 of the bow arm 53 is substantially adapted in such a manner that the initial lifting movement of the engagement part 62 permits only a slight lifting movement of the bow arm 53, if any movement at all. In the position illustrated in FIG. 14, the engagement part 62 is located at the transition from the initial portion 65 of the sliding surface 64 of the bow arm 53 to the substantially flatly extending main sliding surface and has permitted an only slight pivoting out of the wind deflector bow 51.

Figure 15:
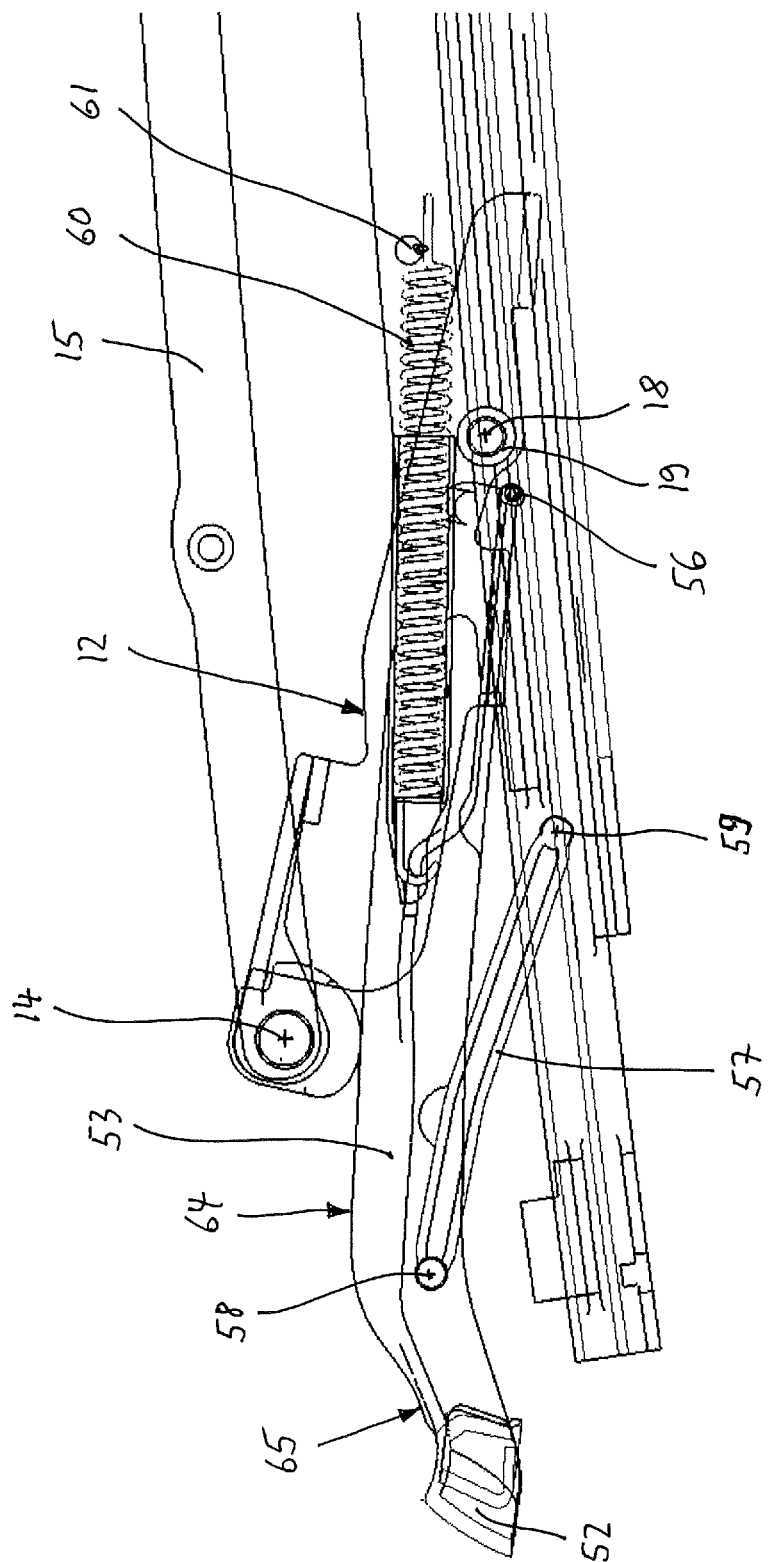
FIG. 15 shows a side view of the bow arm and the bearing arm in a position when the cover according to FIG. 2 is opened further.

During a further opening movement of the cover 2, the bearing arm 12 which is shifted to the rear with the cover 2 reaches its maximum pivoted-out position (see FIG. 15). The engagement part 62 slides on the sliding surface 64 of the bow arm 53 while the wind deflector bow 51 is raised by means of the bow arm 53, which is tensioned by the tension spring 60, and under control by the deployment lever 75.

Figure 16:
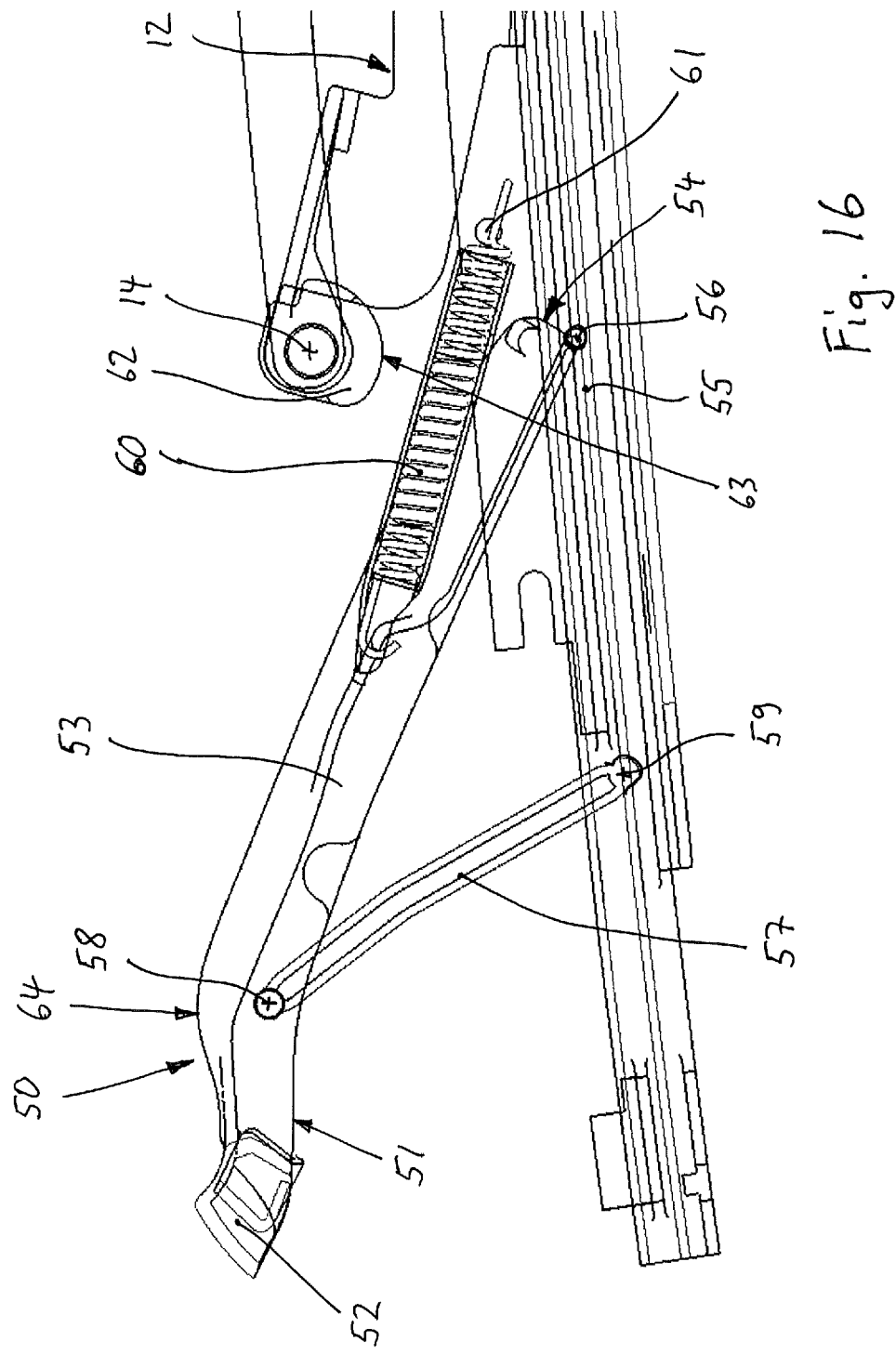
FIG. 16 shows a side view of the bow arm and the bearing arm with the wind deflector bow completely pivoted out when the cover is opened.
Figure 23:
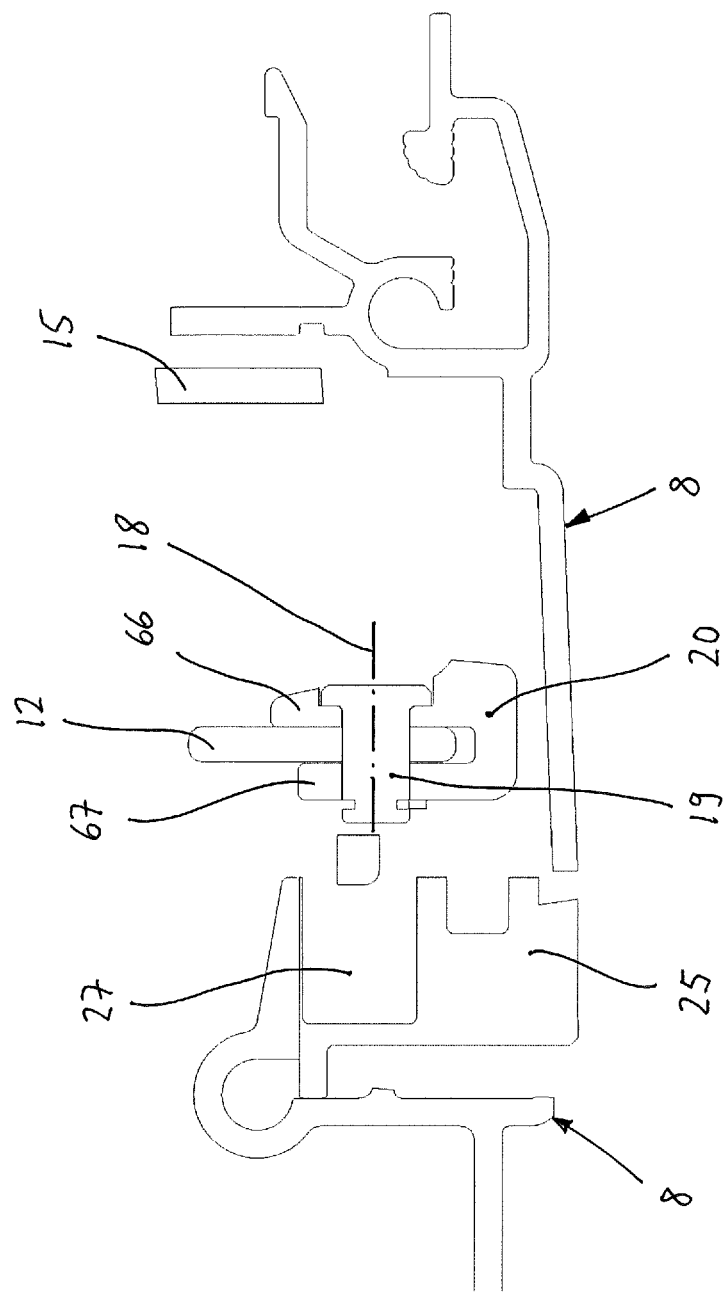
FIG. 23 shows a cross-sectional view of the bearing arm with a pivot bearing which pivotably supports the latter on a bearing carriage, in a position according to FIGS. 2 and 8.
Figure 24:
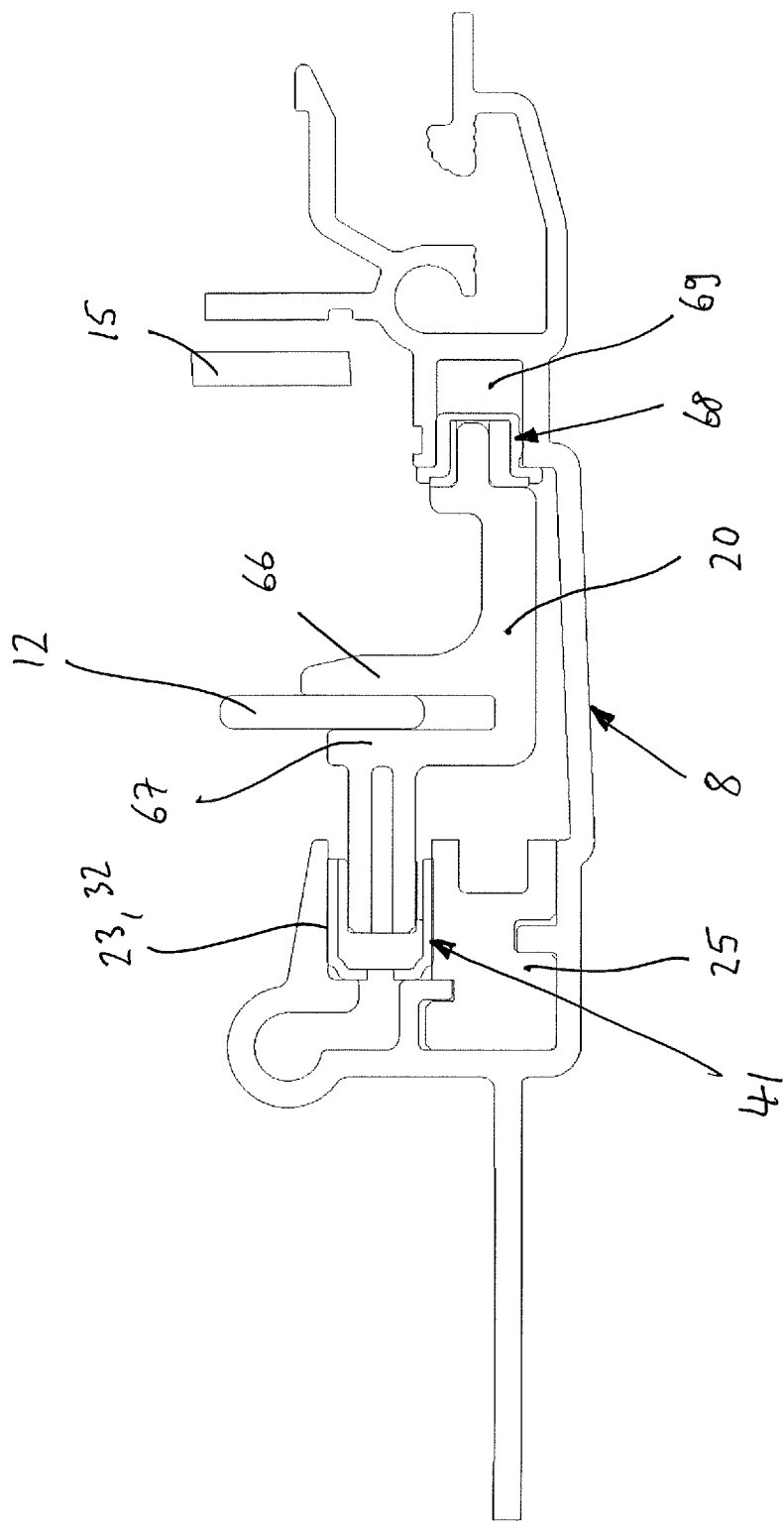
FIG. 24 shows a cross-sectional view of the bearing arm and the bearing carriage with its sliding mounting in a position according to FIGS. 2 and 8.
Figure 25:
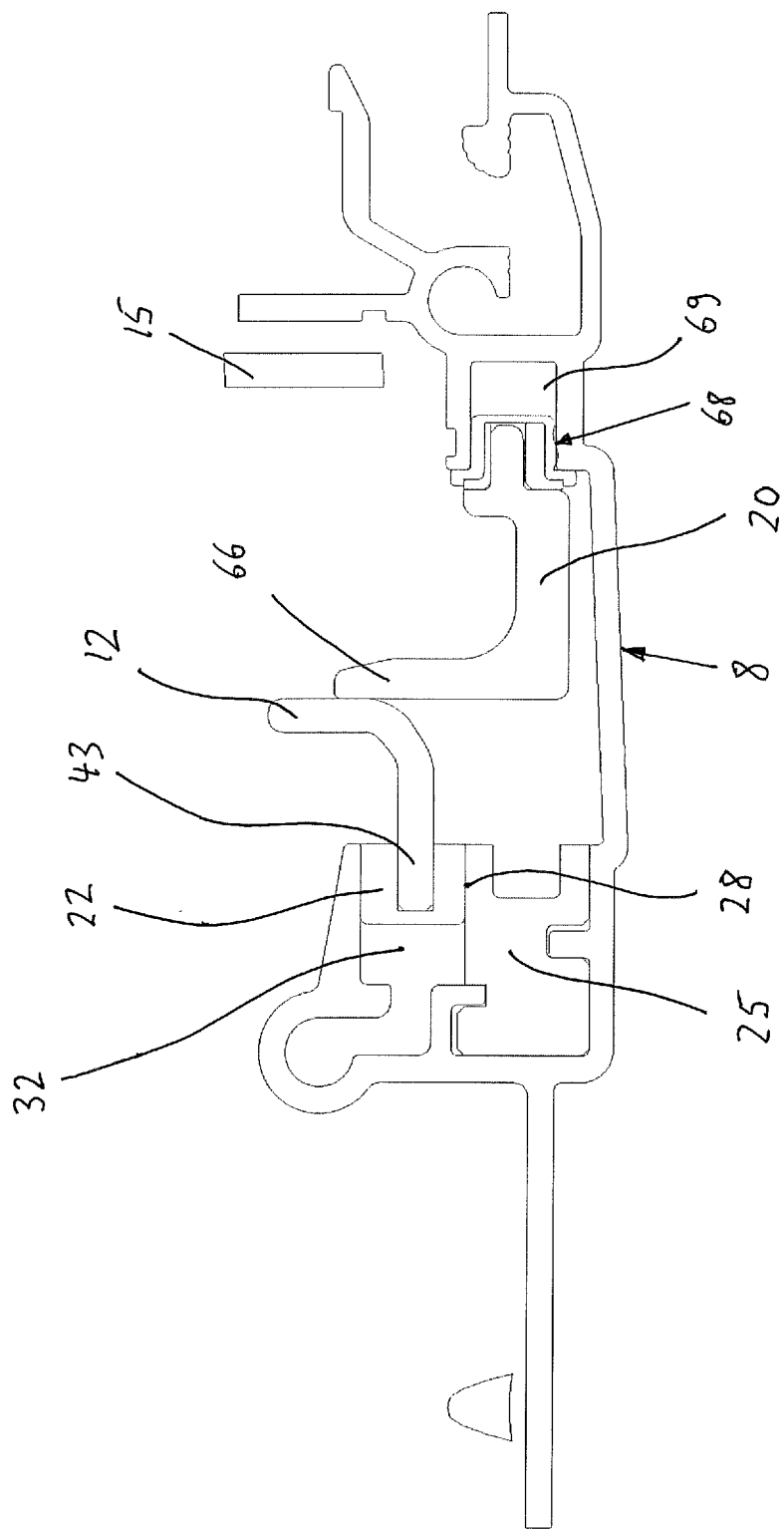
FIG. 25 shows a cross-sectional view of the bearing arm with its rear slider in a position according to FIGS. 2 and 8.

During a further opening movement of the cover 2, the engagement part 62 still slides on the sliding surface 64 of the pivoting-out bow arm 53 until the latter has reached its maximum pivoted-out position and the wind deflector bow 51 is adjusted into its functional or operational position. FIG. 16 shows this position of the wind deflector bow 51, wherein the cover 2 and the bearing arm 12 have been moved further in the opening movement and the engagement part 62 is not in contact with the sliding surface 64 of the pivoted-out bow arm 53.

During a closing movement of the cover 2, the described movement sequence takes place in the opposite direction.

By using the engagement part 62 of the bearing arm 12 to actuate the bow arm 53, a compact arrangement is achieved. An additional control part for actuating the bow arm 53, which control part would otherwise be arranged on the cover 2, is therefore not required.

FIG. 17 shows the schematically illustrated bearing arm 12 with the front slider 21 and the rear slider 22 of the rocker-like mounting in a first arrangement, which corresponds to the arrangement and configuration of the two sliders 21 and 22 described with reference to FIGS. 2 to 12.

FIG. 18 shows the bearing arm 12 in a modified configuration. The two sliders 21 and 22 are arranged via their bearing parts 42 and 43 inward from the bearing arm 12 on the opposite side in comparison to the embodiment of FIG. 17. The two guide slots 23 and 24 of the two sliders 21 and 22 are accordingly located inward from the bearing carriage 20.

FIG. 19 shows the bearing arm 12 in a further modified configuration. In comparison to the configuration of FIG. 17, the two sliders 21 and 22 are formed with a mutually interchanged width, and therefore the front slider 21 is narrower than the rear slider 22. The pivot-control unit 25 is adapted thereto with the front control slot 27 and the rear control slot 28.

FIG. 20 shows the bearing arm 12 in a further modified configuration. In comparison to the configuration of FIG. 17, the rear slider 22 is arranged on the bearing arm 12 on the opposite, inwardly directed side.

FIG. 21 shows a configuration which is modified in comparison to FIG. 20 and in which the positions of the two sliders 21 and 22 on both sides of the bearing arm 12 are interchanged. Also in the case of the two configurations of FIGS. 20 and 21, the pivot-control unit 25 is adapted thereto with the front control slot 27 and the rear control slot 28, and the two guide slots 23 and 24.

The respective distance of the two sliders 21 and 22 from the pivot bearing 19 is determined taking into consideration the required lift of the cover at the cover front edge and the pivoting angle, required for this purpose, of the bearing arm 12, and the track profiles of the front control slot 27 and of the rear control slot 28.

| List of designations | |
|---|---|
| 1 | vehicle roof |
| 2 | cover |
| 3 | roof opening |
| 4 | rear edge |
| 5 | roof portion |
| 6 | front region |
| 7 | front bearing unit |
| 8 | front longitudinal guide |
| 9 | rear bearing unit |
| 10 | rear longitudinal guide |
| 11 | rear deployment lever |
| 12 | bearing arm |
| 13 | front portion |
| 14 | pivot bearing |
| 15 | cover carrier |
| 16 | front edge |
| 17 | rear region |
| 18 | transverse pivot axis |
| 19 | pivot bearing |
| 20 | bearing carriage |
| 21 | front slider |
| 22 | rear slider |
| 23 | upper guide slot |
| 24 | lower guide slot |
| 25 | pivot-control unit |
| 26 | front end |

-continued

| List of designations | |
|---|---|
| 27 | front control slot |
| $27y_1$ | width of the control slot |
| 28 | rear control slot |
| $28y_2$ | width of the control slot |
| 29 | front end |
| 30 | initial portion |
| 31 | intermediate portion |
| 32 | main portion |
| 33 | intermediate portion |
| 34 | slot end |
| 35 | transition portion |
| $35y_3$ | width of the transition portion |
| 36 | rear end |
| 37 | portion |
| 38 | connection portion |
| 39 | lower slot sliding track |
| 40 | upper slot sliding track |
| 41 | carriage slider |
| 42 | bearing part |
| 43 | bearing part |
| 44 | drive carriage |
| 45 | slot guide arrangement |
| 46 | pivot joint |
| 47 | locking slider |
| 48 | locking slot |
| 49 | opening |
| 50 | wind deflector device |
| 51 | wind deflector bow |
| 52 | wind-directing profile |
| 53 | bow arm |
| 54 | rear end |
| 55 | longitudinal guide |
| 56 | bearing |
| 57 | deployment lever |
| 58 | transverse pivot axis |
| 59 | transverse pivot axis |
| 60 | tension spring |
| 61 | fastening point |
| 62 | engagement part |
| 63 | runner |
| 64 | sliding surface |
| 65 | initial portion |
| 66 | profile limb |
| 67 | profile limb |
| 68 | inner slider |
| 69 | guide track |
| 70 | screw |

The invention claimed is:

1. An openable vehicle roof comprising:
a cover and a bearing device which movably supports the cover on a roof-side longitudinal guide by a front bearing unit and a rear bearing unit and adjusts said cover between a closed position in a roof opening and at least one deployed ventilation position,
wherein the front bearing unit has a bearing arm, one end of which pivotably supports the cover and the other end of which is mounted displaceably and pivotably on the longitudinal guide and carries out an adjusting movement controlling a cover front region when the cover is shifted from its closed position into its ventilation position and/or into an open position,
wherein the bearing arm is mounted pivotably on the longitudinal guide, by a rocker-like mounting having a pivot bearing and two sliders, on a bearing carriage, which is mounted displaceably on the longitudinal guide, and in that a pivot-control unit guides the two sliders for the rocker-like pivoting of the bearing arm.

2. The vehicle roof as claimed in claim 1,
wherein the two sliders are arranged on the bearing arm opposite each other in the longitudinal direction with respect to the pivot bearing and are each guided at an associated guide slot of the longitudinal guide, and in that the pivot-control unit has two control slots for the two sliders, which control slots adjoin the guide slots at the front end thereof and the slot profiles of which, by the sliders guided thereon, predetermine a pivoting movement of the bearing arm, the pivoting movement controlling the cover front region.

3. The vehicle roof as claimed in claim 1, wherein the pivot-control unit has a front control slot for the front slider and a rear control slot for the rear slider, and wherein the two control slots raise or lower the two sliders to the level of the respective guide slot.

4. The vehicle roof as claimed in claim 1, wherein the two sliders are at the same distance from the pivot bearing.

5. The vehicle roof as claimed in claim 1, wherein the two guide slots are arranged spaced apart from each other in the transverse direction, the bearing arm is guided with the pivot bearing between the two guide slots, and the two sliders assigned to the respective guide slots are arranged opposite each other on the bearing arm, or wherein the two guide slots are arranged one above the other, the bearing arm is guided with the pivot bearing inward or outward in the transverse direction next to the two guide slots, and the two sliders assigned to the respective guide slot are arranged on the bearing arm on the side facing the guide slots.

6. The vehicle roof as claimed in claim 5, wherein the upper guide slot is provided for guiding the front slider and the lower guide slot for guiding the rear slider, and wherein, in the longitudinal direction, the front control slot is formed in a rising manner to raise the front slider and the rear control slot is formed in a falling manner in order to lower the rear slider from the front closed position of the cover when the bearing arm is pivoted downward.

7. The vehicle roof as claimed in claim 3, wherein the rear control slot is arranged laterally next to the upper guide slot or next to a flatly extending transition portion of the front control slot.

8. The vehicle roof as claimed in claim 3, wherein a front portion of the rear control slot is arranged level with the upper guide slot and the raised main portion of the front control slot, and wherein the front control slot, next to a flatly extending transition portion, or the adjoining upper guide slot has a passage opening for the rear slider.

9. The vehicle roof as claimed claim 3, wherein a lower slot sliding track of the upper guide track or the front control slot of the pivot-control unit has an opening for moving the rear slider during its lifting or lowering movement along the rear control slot.

10. The vehicle roof as claimed in claim 9, wherein the rear slider has a position offset inward in the y direction and/or a reduced width for the passage through the opening.

11. The vehicle roof as claimed in claim 1, wherein the two sliders differ in width in the transverse direction.

12. The vehicle roof as claimed in claim 1, wherein the pivot-control unit is formed as an independent component and is connected to the longitudinal guide or coupled thereto.

13. The vehicle roof as claimed in claim 1, wherein a wind deflector device is arranged on the vehicle roof, said wind deflector device having a wind deflector bow which is prestressed in a pivoting-out position and has in each case a lateral bow arm which is mounted pivotably on the roof side, and wherein the bearing arm has an engagement part which is in control engagement on the bow arm, on a sliding surface of the bow arm.

14. The vehicle roof as claimed in claim 13, wherein the bearing arm has an inwardly cranked front portion, on which a pivot bearing supporting the cover, and the downwardly protruding engagement part, which has a runner, are arranged.

15. The vehicle roof as claimed in claim 13, wherein, when the cover is initially opened, the front portion of the rearwardly moving bearing arm pivots out upward, with the engagement part moving on a rising track curve, to which a similarly rising initial portion of the sliding surface of the bow arm is adapted.

16. The vehicle roof as claimed in claim 1, wherein the rear bearing unit takes over the longitudinal securing of the cover and the deployment of the cover, and is the sole drive unit for actuating and longitudinally shifting the cover.

17. The vehicle roof as claimed in claim 1, wherein the rear bearing unit has a drive carriage on which a rear deployment lever, which is coupled pivotably to the cover or to a cover carrier, is pivotably mounted, wherein the deployment lever has a locking slider and, with the latter is held locked at a roof-mounted locking slot when the cover is closed, pivots out at said locking slot during the initial longitudinal shifting of the drive carriage and when the cover is deployed in the ventilation position, is decoupled from the locking slot and can be shifted longitudinally.

* * * * *